(12) United States Patent
Tanizawa

(10) Patent No.: US 8,385,359 B2
(45) Date of Patent: Feb. 26, 2013

(54) INFORMATION COMMUNICATION SYSTEM, CONNECTION SETTING APPARATUS AND NON-TRANSITORY COMPUTER-READABLE STORAGE MEDIUM STORING CONNECTION SETTING PROGRAM

(75) Inventor: Akinori Tanizawa, Kato (JP)

(73) Assignee: Fujitsu Limited, Kawasaki (JP)

( * ) Notice: Subject to any disclaimer, the term of this patent is extended or adjusted under 35 U.S.C. 154(b) by 303 days.

(21) Appl. No.: 12/926,140

(22) Filed: Oct. 27, 2010

(65) Prior Publication Data

US 2011/0134796 A1 Jun. 9, 2011

(30) Foreign Application Priority Data

Dec. 4, 2009 (JP) ................................. 2009-276325

(51) Int. Cl.
*H04L 12/54* (2006.01)
(52) U.S. Cl. ...................................................... 370/429
(58) Field of Classification Search .................. None
See application file for complete search history.

(56) References Cited

U.S. PATENT DOCUMENTS

| | | | |
|---|---|---|---|
| 7,885,283 B2* | 2/2011 | Ichimura | 370/428 |
| 2002/0194294 A1* | 12/2002 | Blumenau et al. | 709/213 |
| 2004/0250021 A1* | 12/2004 | Honda et al. | 711/114 |
| 2006/0190611 A1 | 8/2006 | Miyazaki et al. | |
| 2008/0031266 A1* | 2/2008 | Tallet et al. | 370/401 |
| 2010/0228840 A1* | 9/2010 | Bose et al. | 709/221 |
| 2011/0280252 A1* | 11/2011 | Murakami et al. | 370/401 |
| 2012/0011240 A1* | 1/2012 | Hara et al. | 709/223 |

FOREIGN PATENT DOCUMENTS

JP 2006-228078 8/2006

* cited by examiner

*Primary Examiner* — Chirag Shah
*Assistant Examiner* — Amar Persaud
(74) *Attorney, Agent, or Firm* — Staas & Halsey LLP

(57) ABSTRACT

A connection setting apparatus includes: a device-registered section to register first and second device information specifying a first and a second information-communication device, respectively; a physical-connection-port-information-acquiring section to acquire a physical connection port information from a first information output port of the first information communication device; a logical-connection-port-information-acquiring-section to acquire a logical connection port information from the second information output port of the second information communication device; a connection-port-display section to display a mark representing the first physical connection port specified by the physical connection port information and a mark representing the second information communication device; a selection section to select the first physical connection port and the second information communication device to be communication parties in information communication by a selection operation to the marks; and a correspondence-registering section to register a logical correspondence between the logical connection port and the first physical connection port.

6 Claims, 16 Drawing Sheets

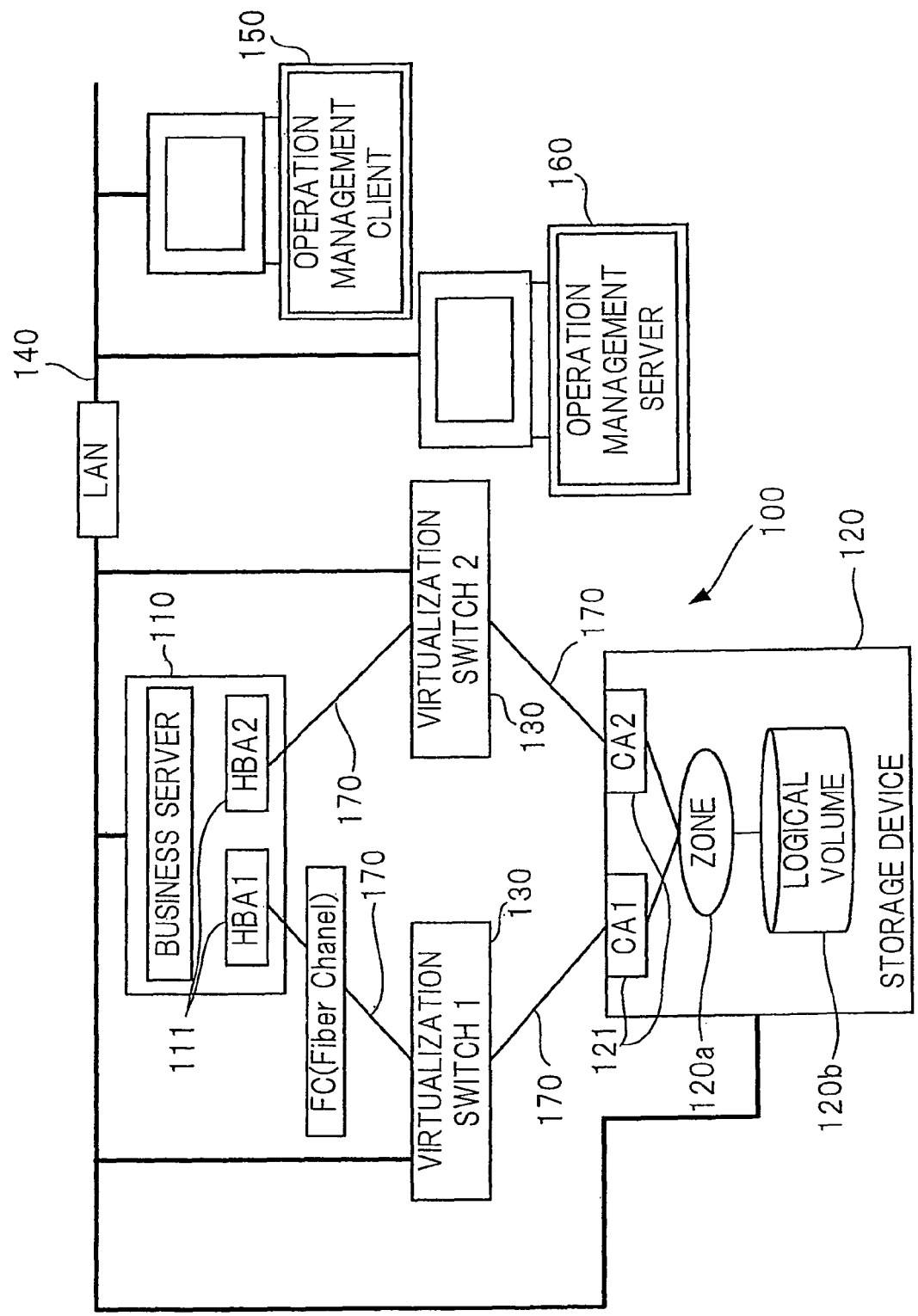

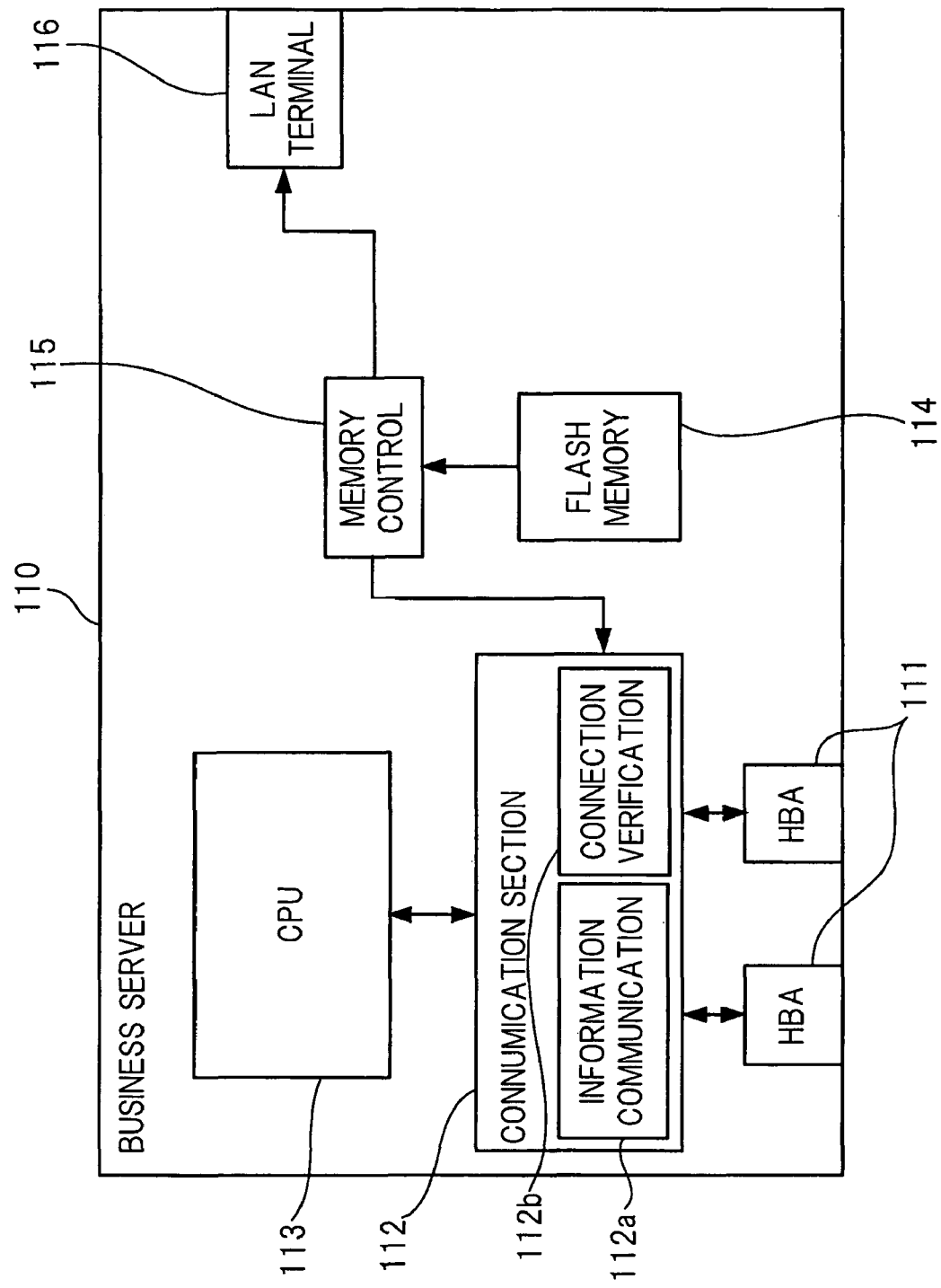

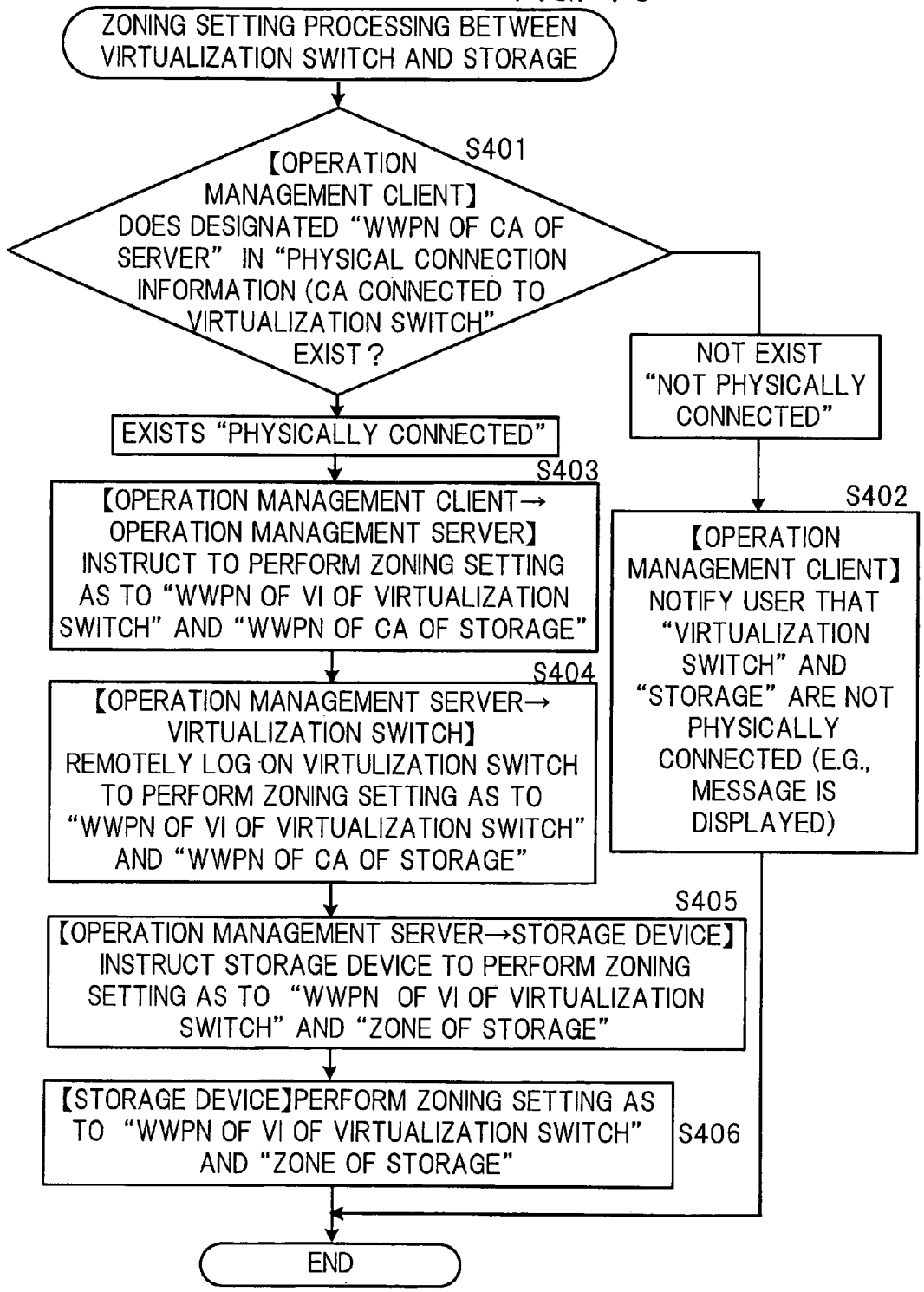

INFORMATION COMMUNICATION SYSTEM, CONNECTION SETTING APPARATUS AND NON-TRANSITORY COMPUTER-READABLE STORAGE MEDIUM STORING CONNECTION SETTING PROGRAM

CROSS-REFERENCE TO RELATED APPLICATION

This application is based upon and claims the benefit of priority of the prior Japanese Patent Application No. 2009-276325, filed on Dec. 4, 2009, the entire contents of which are incorporated herein by reference.

FIELD

The embodiments discussed herein are related to an information communication system, a connection setting apparatus and a non-transitory computer-readable storage medium storing a connection setting program.

BACKGROUND

A network referred to as a storage area network (SAN) has been known, in which one or more server devices and one or more storage devices are connected through fibre channel (FC) switches. The SAN is a type of information communication system in that information communication is performed on a network. In addition, as a technique used on the SAN, a technique referred to as zoning is known (see, e.g., Japanese Patent Application Laid-open No. 2006-228078). In such zoning, FC ports for devices connected to FC switches are divided into groups called zones. The FC ports belonging to a zone are allowed to communicate with one another, and thereby an exclusive access is achieved.

In many information communication systems in recent years not limited to SANs and zoning, communication of information may not be performed by merely physically connecting between devices a communication line for communication purpose. In order for information communication to be performed in an information communication system, the party of the information communication has to be registered for a device that constitutes the information communication system.

However, such a registration involves a task of acquiring and registering information for specifying each communication port for each device incorporated into the information communication system. Therefore, as the information communication system is increased in size and complexity, chances of task mistakes increase as the tasks become more complex.

SUMMARY

According to an aspect of the invention, an information communication system includes a first information communication device, a second information communication device and a communication network. The information communication system further includes a connection setting apparatus.

The first information communication device includes a first physical connection port, a first communication section and a first information output port. The first physical connection port is where a communication line for information communication physically connects. The first communication section performs information communication through the communication line connected to the first physical connection port. The first information output port outputs physical connection port information that specifies the first physical connection port.

The second information communication device includes a second physical connection port, a logical connection port storage section, a correspondence registered section, a second communication section and a second information output port. The second physical connection port is a port to which a communication line for information communication physically connects. The logical connection port storage section stores logical connection port information that specifies a logical connection port, which is a logical entity. The logical connection port is to be a logical connection destination for the communication line physically connected to the second physical connection port. The correspondence registered section is a port where a logical correspondence between the logical connection port specified by the logical connection port information and the first physical connection port is registered. The second connection section performs information communication through the communication line connected to the second physical connection port with, as the communication party, the first physical connection port for which the logical correspondence is registered with the correspondence registered section. The second information output port outputs logical connection port information stored in the logical connection port storage section.

The communication network is connected to the first information output port, the second information output port, and the correspondence registered section.

The connection setting apparatus includes a device registered section, a physical connection port information acquiring section, a logical connection port information acquiring section, a connection port display section, a device display section, a selection section and a correspondence registering section. The device registered section is a section where first device information that specifies the first information communication device and second device information that specifies the second information communication device are each registered. The physical connection port information acquiring section acquires the physical connection port information through the communication network from the first information output port of the first information communication device specified by the first device information registered in the device registered section. The logical connection port information acquiring section acquires the logical connection port information through the communication network from the second information output port of the second information communication device specified by the second device information registered in the device registered section. The connection port display section displays on a display screen a physical connection port icon that represents the first physical connection port specified by the physical connection port information acquired by the physical connection port information acquiring section. The device display section displays on the display screen a device icon that represents a second information communication device specified by the second device information registered in the device registered section. The selection section selects the first physical connection port and the second information communication device, which are to be parties with each other in information communication, by a selection operation to the physical connection port icon and the device icon which are displayed on the display screen. The correspondence registering section registers a logical correspondence between the logical connection port and the first physical connection port in the correspondence registered section of the second information communication device selected by the selection section through the communication network. The logical connection port for which the logical correspondence is registered is specified by the logical connection port information acquired by the logical connection port information acquiring section from the selected second information communication device. The first physical connection port for which the logical correspondence is registered is selected by the selection section as the party of the selected second information communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a storage area network (SAN) corresponding to a second embodiment of the information communication system;

FIG. 5 is a diagram illustrating an internal configuration of a business server;

FIG. 16 is a flowchart illustrating zoning setting processing between a virtualization switch and a storage device.

DESCRIPTION OF EMBODIMENTS

Exemplary embodiments of an information communication system, a connection setting apparatus and a non-transitory computer-readable storage medium storing a connection setting program will be described below with reference to the drawings.

Figure 1:
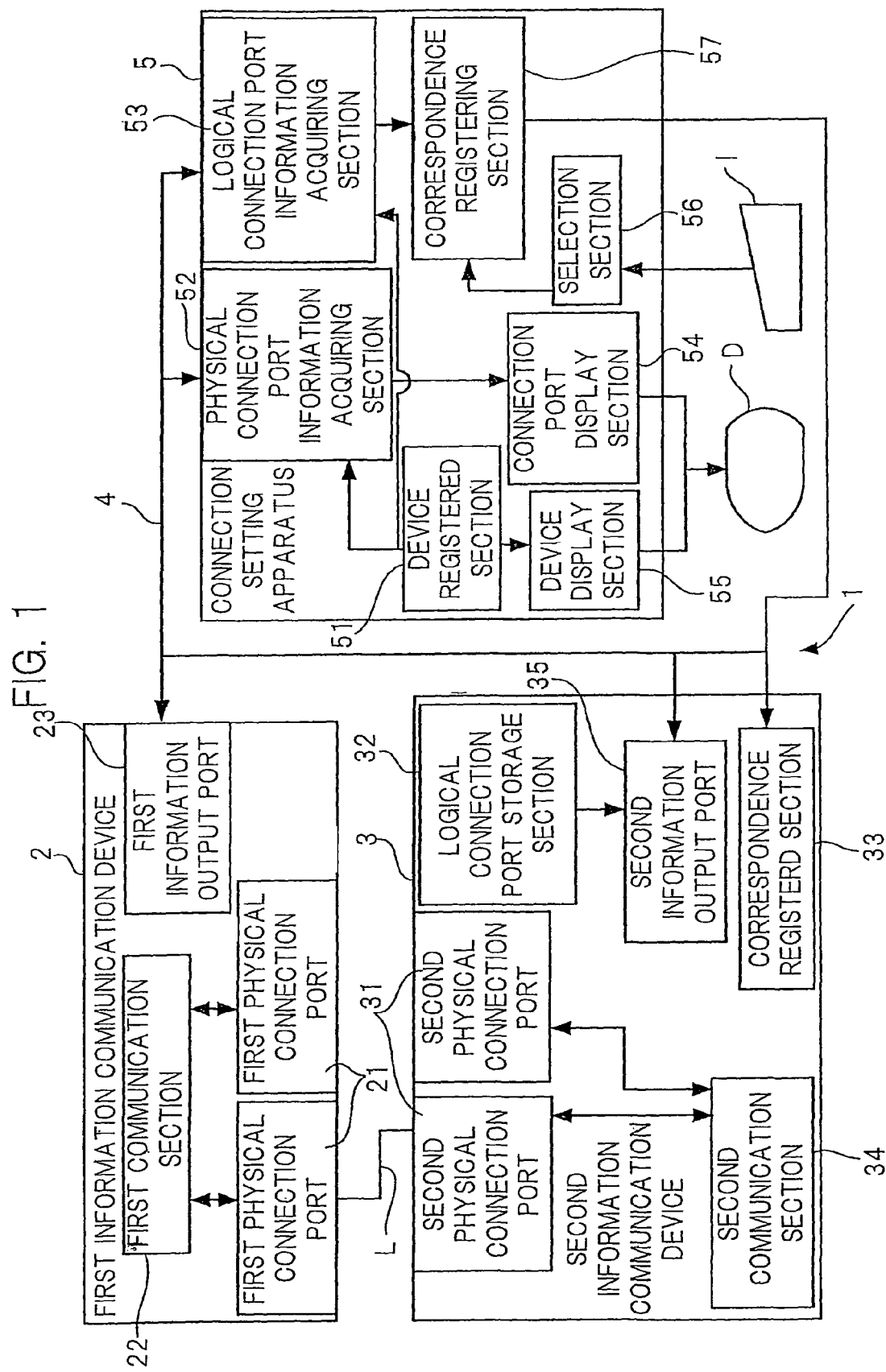
FIG. 1 is a diagram illustrating a first embodiment of an information communication system.

FIG. 1 is a diagram illustrating a first embodiment of an information communication system.

An information communication system 1 illustrated in FIG. 1 includes a first information communication device 2, a second information communication device 3, a communication network 4 and a connection setting apparatus 5. The connection setting apparatus 5 corresponds to a first embodiment of the connection setting apparatus.

The first information communication device 2 includes one or more first physical connection ports 21, a first communication section 22 and a first information output port 23. The first physical connection port 21 is a port to which a communication line L used for information communication physically connects. The first communication section 22 performs information communication with other information communication devices through the communication line L connected to the first physical connection port 21. The first information output port 23 outputs physical connection port information that specifies the first physical connection port 21.

The second information communication device 3 includes one or more second physical connection ports 31, a logical connection port storage section 32, a correspondence registered section 33, a second communication section 34 and a second information output port 35. The second physical connection port 31 is a port to which the communication line L for information communication physically connects. The logical connection port storage section 32 stores logical connection port information that specifies a logical connection port, which is to be a logical connection party of the first physical connection port 21. The correspondence registered section 33 is a section where information that indicates a logical correspondence between the logical connection port specified by the logical connection port information and the first physical connection port 21 is registered. The second communication section 34 performs information communication through the communication line L connected to the second physical connection port 31 with, as the communication party, the first physical connection port 21 for which the logical correspondence with the logical connection port is registered in the correspondence registered section 33. The second information output port 35 outputs logical connection port information stored in the logical connection port storage section 32.

The first information output port 23, the second information output port 35 and the correspondence registered section 33 are connected to the communication network 4.

The connection setting apparatus 5 includes a device registered section 51, a physical connection port information acquiring section 52, a logical connection port information acquiring section 53, a connection port display section 54, a device display section 55, a selection section 56 and a correspondence registering section 57.

The device registered section 51 is a section where first device information that specifies the first information communication device 2 and second device information that specifies the second information communication device 3 are each registered.

The physical connection port information acquiring section 52 acquires physical connection port information that specifies the first physical connection port 21 thought the communication network 4. The physical connection port information is information outputted from the first information output port 23 of the first information communication device 2. In addition, the physical connection port information acquiring section 52 acquires the physical connection port information from the first information output port 23 of the first information communication device 2 specified by the first device information registered in the device registered section 51.

The logical connection port information acquiring section 53 acquires logical connection port information that indicates the logical connection port, which is to be a candidate for the logical connection destination of the first physical connection port 21, through the communication network 4. The logical connection port information is information output from the second information output port 35 of the second information communication device 3. In addition, the logical connection port information acquiring section 53 acquires the logical connection port information from the second information output port 35 of the second information communication device 3 specified by the second device information registered in the device registered section 51.

The connection port display section 54 displays on a display screen D a physical connection port mark that represents the first physical connection port 21 specified by the physical connection port information acquired by the physical connection port information acquiring section 52.

The device display section 55 displays on the display screen D a device mark that represents the second information communication device 3 specified by the second device information registered in the device registered section 51.

The selection section 56 receives a selection operation using an input device I for the physical connection port mark and device mark displayed on the display screen D. This selection operation allows the first physical connection port 21 and the second information communication device 3 to be selected, which are to be mutual communication parties in information communication.

The correspondence registering section 57 registers a logical correspondence between a logical connection port and the first physical connection port 21 in the second information communication device 3 selected by the selection section 56 through the communication network 4. The logical correspondence is registered with the correspondence registered section 33 of the second information communication device 3. In addition, the logical connection port for which the logical correspondence with the first physical connection port is registered in the correspondence registered section is specified by the logical connection port information acquired by the logical connection port information acquiring section 53 from the second information communication device 3 selected by the selection section. The first physical connection port 21 for which the logical correspondence with the logical connection port is registered is selected by the selection section 56 as the communication party of the selected second information communication device 3.

According to such an information communication system 1, most information required for connection setting is collected by the connection setting apparatus 5. Therefore, a user may sensibly specify a connection relation between connection ports by selecting through a selection operation a mark that is displayed on the display screen D, and typified by an icon, thus achieving efficient and reliable connection setting.

Figure 2:
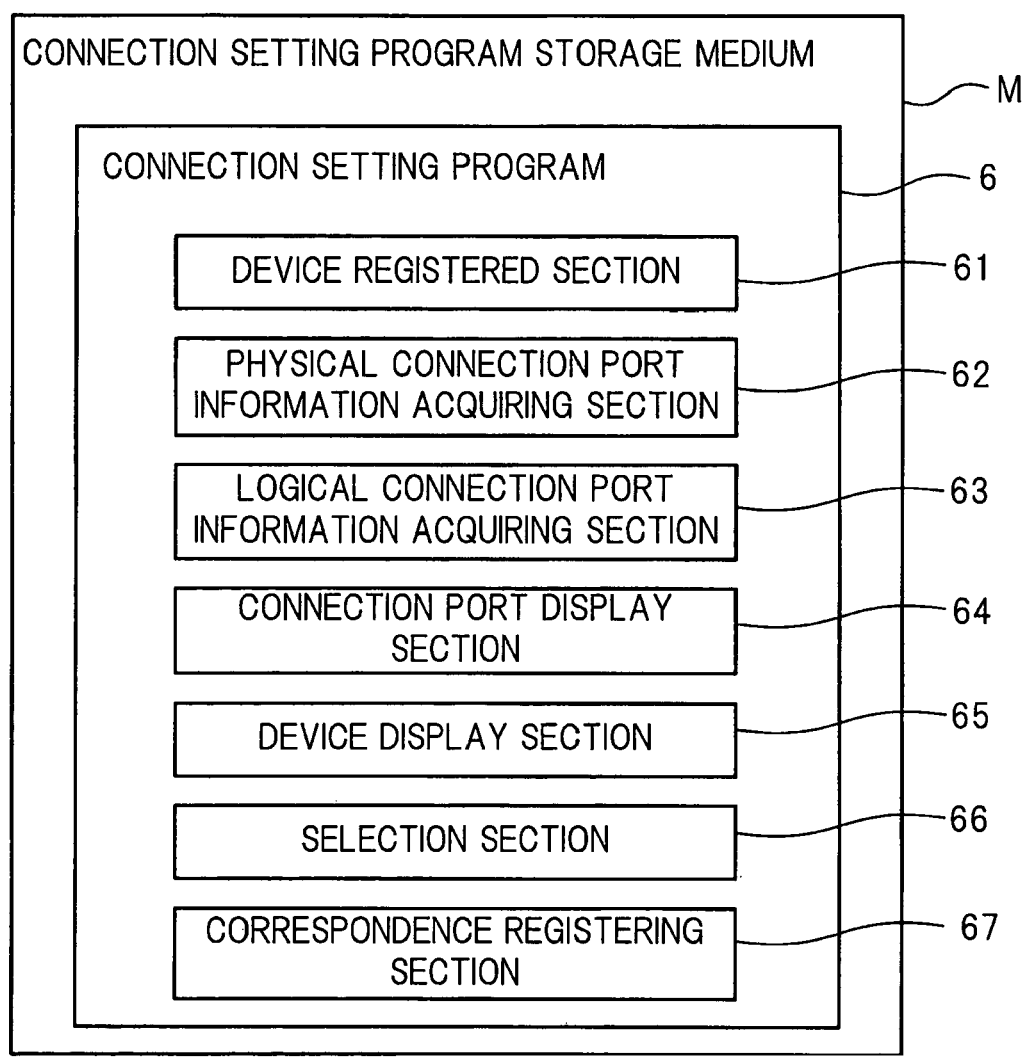
FIG. 2 is a diagram illustrating a first embodiment of a connection setting program.

FIG. 2 is a diagram illustrating a first embodiment of a connection setting program.

A connection setting program 6 illustrated in FIG. 2 is stored in a connection setting program storage medium M. The connection setting program 6 is loaded into a computer from the connection setting program storage medium M.

The connection setting program storage medium M may be any type of storage media as long as a connection setting program may be stored. The connection setting program storage medium M may be a portable medium typified by CDs and DVDs, for example, or a non-removable medium typified by a magnetic disk incorporated into a hard disk device. In addition, this connection setting program storage medium M may be a solid-state memory element typified by a USB memory.

Further, the connection setting program 6 may be loaded into a computer from another device through a telecommunication network without through the connection setting program storage medium M.

The connection setting program 6 is executed on the computer in which the connection setting program 6 is loaded to build in the computer the connection setting apparatus 5 illustrated in FIG. 1.

More specifically, the connection setting program 6 illustrated in FIG. 2 includes a device registered section 61, a physical connection port information acquiring section 62, a logical connection port information acquiring section 63, a connection port display section 64, a device display section 65, a selection section 66 and a correspondence registering section 67. The device registered section 61 and the physical connection port information acquiring section 62 included in the connection setting program 6 build the device registered section 51 and the physical connection port information acquiring section 52 of the connection setting apparatus 5 illustrated in FIG. 1, respectively. In addition, the logical connection port information acquiring section 63 and the connection port display section 64 included in the connection setting program 6 build the logical connection port information acquiring section 53 and the connection port display section 54 of the connection setting apparatus 5 illustrated in FIG. 1, respectively. Further, the device display section 65, the selection section 66 and the correspondence registering section 67 included in the connection setting program 6 build the device display section 55, the selection section 56 and the correspondence registering section 57 of the connection setting apparatus 5 illustrated in FIG. 1, respectively.

Next, a second embodiment of the information communication system, the connection setting apparatus and the connection setting program will be described below.

The second embodiment corresponds to an example of each of the following first application and second application.

In the first application, the second information communication device includes a connected connection port verification section. The connected connection port verification section acquires physical connection port information that specifies a first physical connection port to which a communication line is connected through the communication line physically connected to the second physical connection port. In addition, in the first application, the second information output port of the second information communication device also outputs the physical connection port information acquired by the connected connection port verification section. Further, in the first application, the connection setting apparatus includes a connected information acquiring section and a connection verification section. The connected information acquiring section acquires physical connection port information acquired by the connected connection port verification section of the second information communication device through the communication network from the second information output port of the second information communication device selected by the selection section. The connection verification section verifies whether or not physical connection port information that specifies the first physical connection port selected by the selection section is contained in the physical connection port information acquired by the connected information acquiring section. Further, in the first application, when a physical connection is verified, the correspondence registering section of the connection setting apparatus registers a logical correspondence between the first physical connection port and the logical connection port. This physical connection verification means that the connection verification section verifies that the physical connection port information that specifies the first physical connection port selected by the selection section is contained in the physical connection port information acquired by the connected information acquiring section.

According to such a first application, it is assured that, with respect to a logical correspondence registered by the correspondence registering section, it is actually physically communicatable.

Further, the second application includes as the first information communication device two or more types of devices performing information intercommunication through the second information communication device. In addition, according to the second application, the second information communication device builds a logical communication path in the information intercommunication of the two or more types of devices.

According such a second application, a network in which two or more types of the first information communication devices are interconnected through a communication path may be efficiently and reliably built.

FIG. 3 is a diagram illustrating a storage area network (SAN) corresponding to the second embodiment of the information communication system.

A storage area network 100 illustrated in FIG. 3 includes a business server 110, a storage device 120 and a virtualization switch 130. The business server 110, the storage device 120 and the virtualization switch 130 are connected to one another through a fibre channel (FC) 170. By way of example, physically, the fibre channel 170 is an optical fibre cable. Note that, for convenience of illustration, one business server 110 and one storage device 120 are illustrated in FIG. 3, but two or more business servers 110 and storage devices 120 may be provided in the storage area network 100.

The business server 110 receives access from other computers (not illustrated), and provides various services. Then, the business server 110 achieves vast amounts of information storage and information provision involved in its service provision through the storage area network 100. The storage device 120 serves as a storage area in the storage area network 100. The storage areas provided by respective storage devices 120 are bundled by the virtualization switch 130 so as to function as one large information storage device.

The business server 110 includes more than one host bus adapter (HBA) 111, which is a connection point in the fibre channel 170. In addition, the storage device 120 includes more than one channel adapter (CA) 121, which is a connection point in the fibre channel 170. The virtualization switch 130 is a type of FC switch for setting and switching a connection path that interconnects these host bus adapters 111 and channel adapters 121.

In the storage device 120, one or more channel adapters 121 are brought together so as to be managed as one zone 120a. The zone 120a is a logical entity. Other zones than the zone 120a are also managed in the storage device 120, which are not illustrated. In addition, the storage device 120 includes a physical large-capacity storage area. The storage device 120 has, assigned to the storage area thereof, a logical volume 120b, which is a logical entity. Further, the storage device 120 associates its logical volume 120b with the zone 120a, as well as assigning another logical volume to another zone. An external device such as the business server 110 accesses the storage area by specifying the logical volume 120b. However, since designating the logical volume of another zone is prohibited, exclusive access is achieved for each zone.

The storage area network 100 further includes an operation management client 150 and an operation management server 160. The operation management client 150 and the operation management server 160 are connected to the business server 110, the storage device 120 and the virtualization switch 130 through a LAN (Local Area Network) 140. The operation management client 150 and the operation management server 160 manage the storage area network 100.

Specifically, the operation management client 150 and the operation management server 160 manage setting and switching of the connection path in the virtualization switch 130, and the assignment of the zone 120a and the logical volume 120b in the storage device. The operation management client 150 and the operation management server 160 are a so-called server client system. In other words, the operation management server 160 accesses the business server 110, the storage device 120 and the virtualization switch 130 in accordance with an instruction from the operation management client 150. Further, the operation management server 160 collects various types of information by periodically and automatically accessing the business server 110, the storage device 120 and the virtualization switch 130. As a result, WWPNs of the host bus adapters 111 and the channel adapter 121 in the business server 110 and the storage device 120 are stored in the operation management server 160. Further, as a result of the information collection, connection information representing a connection relation between devices on the storage area network 100 is also stored in the operation management server 160.

Each of the business server 110 and the storage device 120 corresponds to an example of the first information communication device. The business server 110 and the storage device 120 correspond to an example of the two or more types of first information communication devices in the second application. Each of the host bus adapters (HBA) 111 and the channel adapter (CA) 121 corresponds to an example of the first physical connection port. The virtualization switch 130 corresponds to an example of the second information communication device, and an example of the second information communication device in the second application, and the combination of the LAN 140 and the operation management server 160 corresponds to an example of the communication network. The operation management server 160 serves as a device to mediate information on the communication network. The fibre channel (FC) 170 corresponds to an example of the communication line.

As the hardware of the operation management client 150, a personal computer is used in the present embodiment. As the hardware of the operation management server 160, a general-purpose server computer is used in the present embodiment.

FIG. 4 is a diagram illustrating an external appearance of various types of devices included in the storage area network.

Figure 4A:
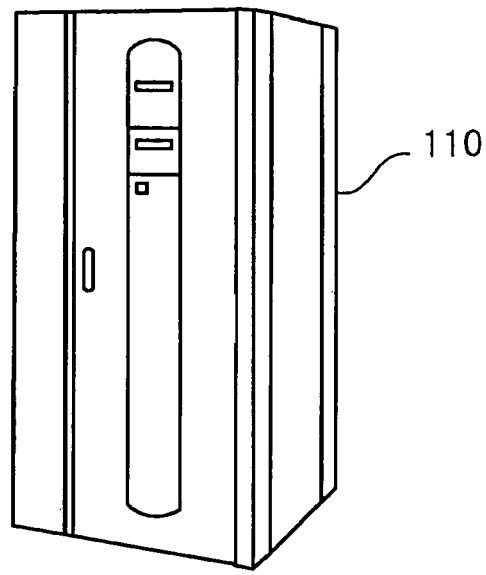
FIGS. 4A, 4B and 4C are diagrams illustrating the appearance of various devices included in the storage area network.
Figure 4B:
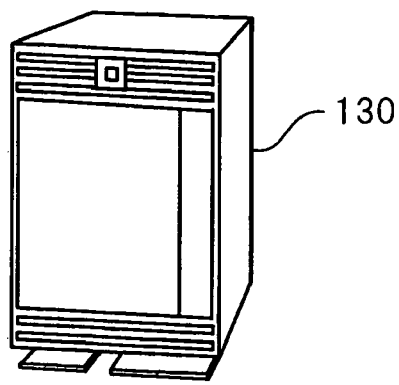
Figure 4C:
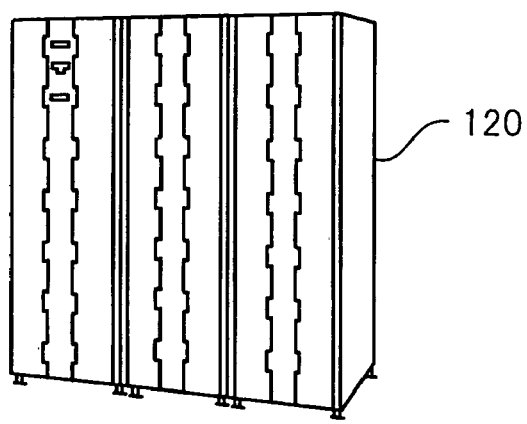

The external appearance of the business server 110 is illustrated in FIG. 4A. In addition, the appearance of the virtualization switch 130 is illustrated in FIG. 4B, and the appearance of the storage device 120 is illustrated in FIG. 4C. The business server 110, the storage device 120 and the virtualization switch 130 are all devices having box shape appearance. Further, these devices carry out their functions by exchanging information with external devices through a communication line such as a fibre channel and a LAN.

FIG. 5 is a diagram illustrating an internal configuration of a business server.

In addition to the host bus adapters 111 described above, the business server 110 includes a communication section 112, a center processing unit (CPU) 113, a flash memory 114, a memory control section 115 and a LAN terminal 116. Further, functions as an information communication section 112a and a connection verification section 112b are included in the communication section 112. However, the configuration diagram of the business server 110 of FIG. 5 illustrates components limited to necessary functions for establishment of a connection path in the storage area network 100. In addition to the components illustrated in FIG. 5, the business server 110 includes a component for performing a function of providing a service as the business server 110.

The communication section 112 plays a role of a function in which the business server 110 communicates information with an external device through the host bus adapters 111. The information communication section 112a provided in the communication section 112 communicates information processed by the CPU 113 to an external device (specifically, storage device 120) through the host bus adapter 111 and the fibre channel 170 described above. The flash memory 114 stores WWPNs (world wide port name) for uniquely specifying the host bus adapter 111. Although the memory control section 115 controls reading/writing of information from/to the flash memory 114, the memory control section 115 entirely reads WWPNs in the establishment of a connection path. The LAN terminal 116 is a terminal to which a LAN cable is connected. Although the business server 110 provides original service provision through the LAN terminal 116, the LAN terminal 116 is entirely used to output the WWPN of the host bus adapter 111 in the establishment of a connection path.

The connection verification section 112b provided on the communication section 112 notifies the communication party device connected to the host bus adapter 111 through the fibre channel 170 of the WWPN of the host bus adapter 111 via the fibre channel 170.

Specifically the information communication section 112a in the communication section 112 corresponds to an example of the first communication section. The LAN terminal 116 corresponds to an example of the first information output port.

Figure 6:
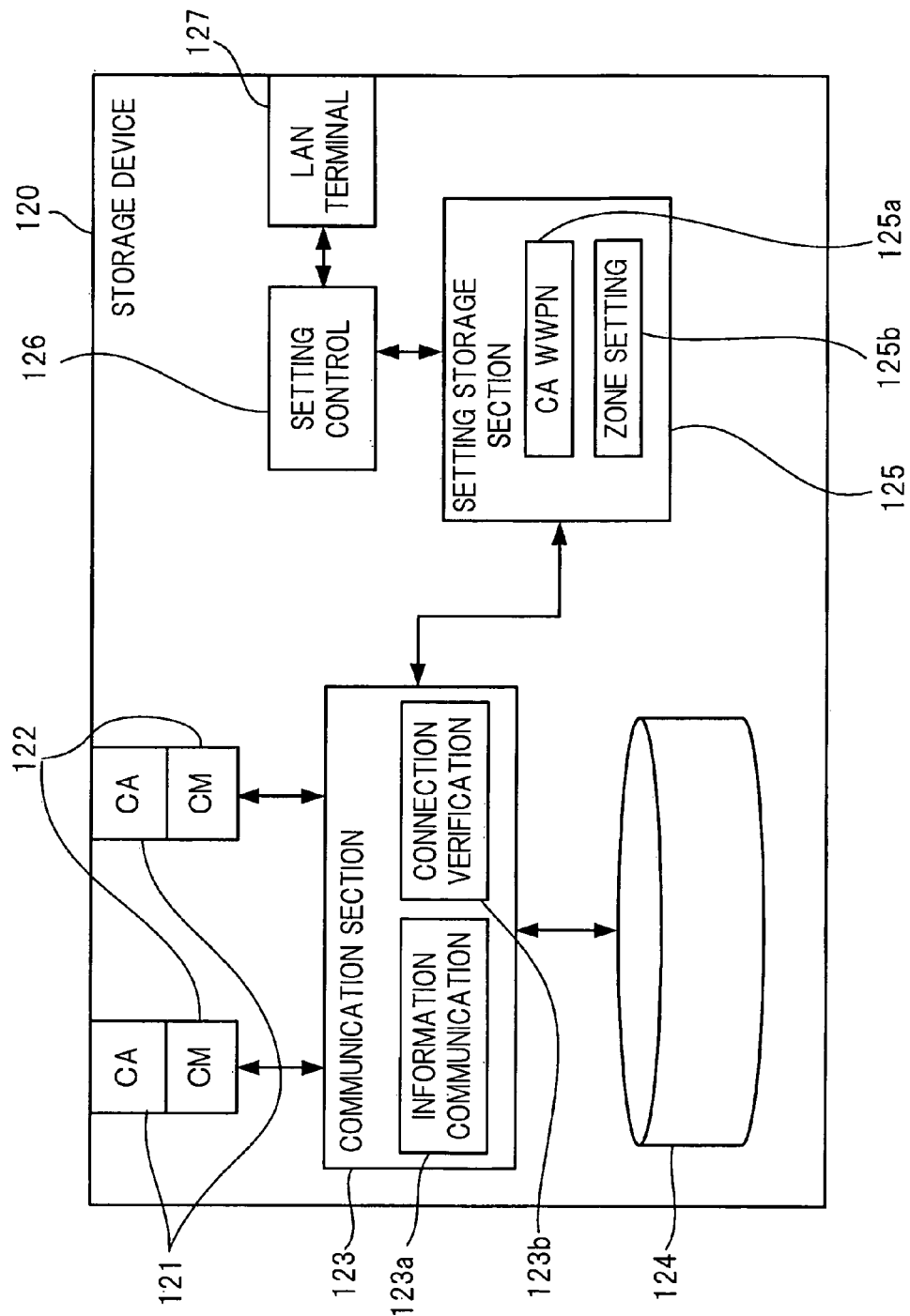
FIG. 6 is a diagram illustrating an internal configuration of a storage device.

FIG. 6 is a diagram illustrating an internal configuration of a storage device.

In addition to the channel adapter 121, the storage device 120 includes a control module (CM) 122, a communication section 123, a storage medium 124, a setting storage section 125, a setting control section 126 and a LAN terminal 127.

The control module 122 controls the channel adapter 121. The storage medium 124 is a medium serving as a physical storage area provided by the storage device. The communication section 123 performs information communication with an external device through the channel adapter 121. The information communication section 123a provided on the communication section 123 controls soft communication when the external device accesses the storage medium 124. By controlling the information communication section 123a, the zone 120a and the logical volume 120b illustrated in FIG. 3 are achieved.

As the hardware of the setting storage section 125, a flash memory is used in the present embodiment. The setting storage section 125 stores a WWPN 125a for uniquely specifying the channel adapter 121, and zone setting information 125b including the setting of the zone 120a and the logical volume 120b illustrated in FIG. 3. The setting control section 126 controls reading/writing of information from/to the setting storage section 125. The information communication section 123a included in the communication section 123 acquires the zone setting information 125b from the setting storage section 125 through the setting control section 126. Then, the information communication section 123a uses the acquired zone setting information 125b to realize the zone 120a and the logical volume 120b illustrated in FIG. 3. The zone setting information 125b includes the WWPN of the channel adapter 121 belonging to a zone 120a and the partition of the logical volume 120b that may be accessed by the zone 120a. The zone setting information 125b also includes the WWPN of a connection party that may access the zone 120a through the channel adapter 121. Among these pieces of information, the procedure of setting the WWPN of a connection party will be described later; in regard to other pieces of information, the description will be provided assuming that the settings have been accomplished by a conventional procedure.

The connection verification section 123b provided in the communication section 123 acquires the WWPN 125a of the channel adapter 121 from the setting storage section 125 through the setting control section 126.

The connection verification section 123b notifies the communication party device (virtualization switch in the present embodiment) physically connected to the channel adapter 121 through the fibre channel 170 of the acquired WWPN 125a via the fibre channel 170.

The LAN terminal 127 is a terminal to which a LAN cable is connected. A command is input to the setting control section 126 via the LAN terminal 127. The command is input from the operation management server 160 in the present embodiment, and may also be inputted from the operation management client 150. The setting control section 126 registers the zone setting information 125b with the setting storage section 125 in accordance with the command via the LAN terminal 127. In addition, in accordance with another command via the LAN terminal 127, the setting control section 126 outputs the WWPN 125a stored in the setting storage section 125 via the LAN terminal 127.

The information communication section 123a provided on the communication section 123 corresponds to an example of the first communication section. The LAN terminal 127 corresponds to an example of the first information output port. The WWPN 125a of the channel adapter 121 corresponds to an example of the physical connection port information.

Figure 7:
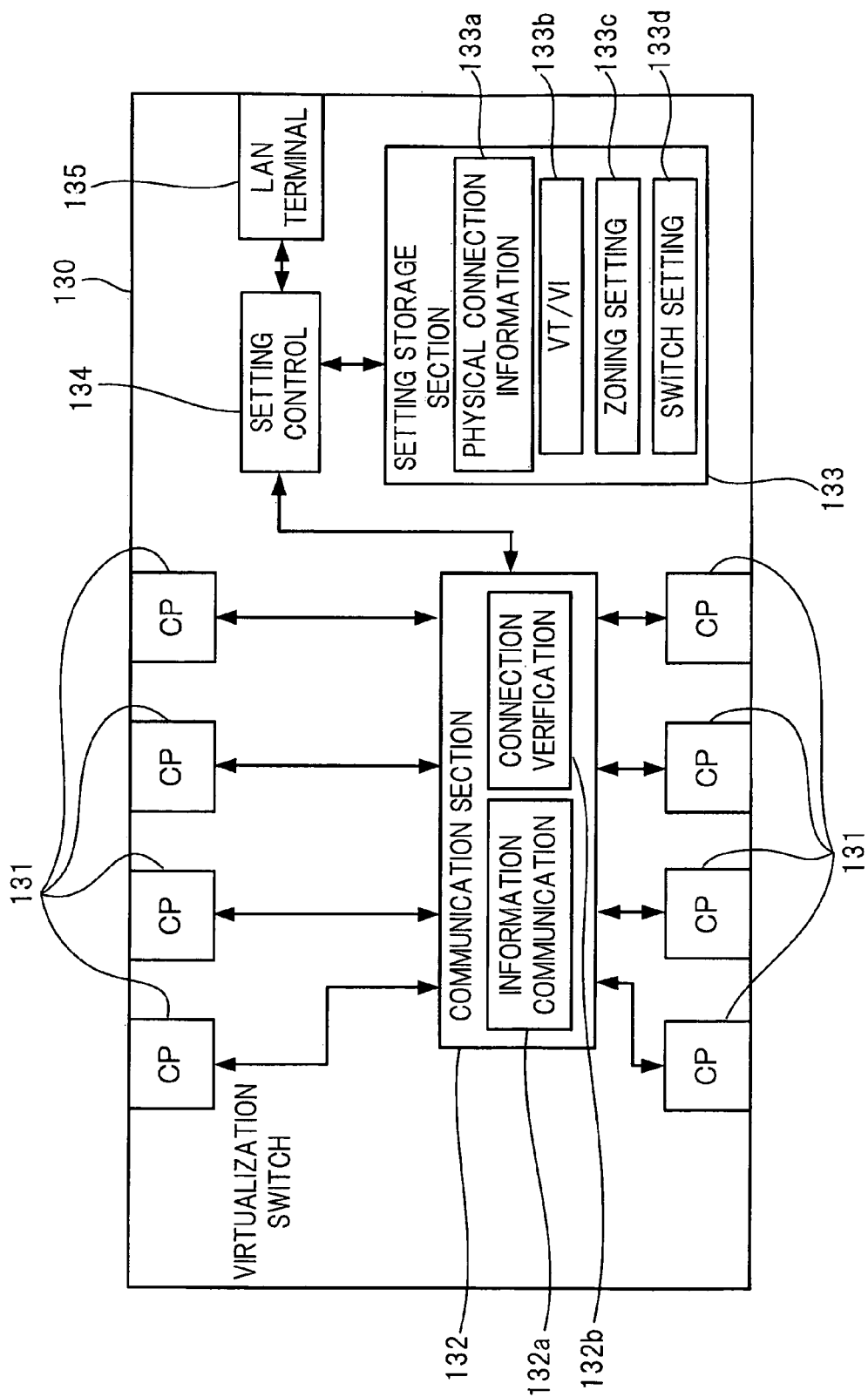
FIG. 7 is a diagram illustrating an internal configuration of a virtualization switch.

FIG. 7 is a diagram illustrating an internal configuration of a virtualization switch.

The virtualization switch 130 includes channel ports (CP) 131, a communication section 132, a setting storage section 133, a setting control section 134 and a LAN terminal 135.

The channel ports 131 are connection ports to which the fibre channel 170 is connected. The communication section 132 performs information communication with the business server 110 and the storage device 120 through the channel ports 131. The information communication section 132a included in the communication section 132 serves as a FC switch. In other words, the information communication section 132a establishes an information communication path interconnecting the business server 110 and the storage device 120 with each other.

As the hardware of the setting storage section 133, a flash memory is used in the present embodiment. The setting storage section 133 stores physical connection information 133a, VT/VI information 133b, zoning setting information 133c and switch setting information 133d. The physical connection information 133a is the WWPN of a communication party connected through the fibre channel 170 connected to the channel port 131. The VT/VI information 133b is a WWPN representing a virtual initiator (VI) and a WWPN representing a virtual target (VT). The virtual initiator (VI) is a logical communication party to the channel adapter 121 of the storage device 120. In addition, the virtual target (VT) is the logical communication party of the host bus adapter 111 of the business server 110. The zoning setting information 133c represents a combination between the WWPN of the channel adapter 121 and the WWPN of the virtual initiator, and a combination between the WWPN of the host bus adapter 111 and the WWPN of the virtual target. Each combination is also referred to as a "zone" in the present embodiment. In addition, storing the zoning setting information 133c representing the combination into the setting storage section 133 is referred to as a "zoning setting" in the present embodiment. The switch setting information 133d represents the logical connection relation between the virtual initiator and the virtual target.

The setting control section 134 controls reading/writing of information from/to the setting storage section 133. The information communication section 132a included in the communication section 132 acquires the zoning setting information 133c and the switch setting information 133d through the setting control section 134. The information communication section 132a performs information communication with the communication party represented by the acquired zoning setting information 133c and switch setting information 133d. In this manner, the information communication section 132a performs information communication to build a connection configuration in the storage area network 100 illustrated in FIG. 3.

The connection verification section 132b included in the communication section 132 acquires WWPNs from the connection verification sections 112b and 123b of the business server 110 and the storage device 120 through the fibre channel 170 connected to the channel ports 131. The connection verification section 132b stores, as physical connection information 133a, the acquired WWPN in the setting storage section 133 via the setting control section 134.

The LAN terminal 135 is a terminal to which a LAN cable is connected. In accordance with the command via the LAN terminal 135, the setting control section 134 stores in the setting storage section 133 the WWPN of the virtual target, the zoning setting information 133c and the switch setting information 133d.

The channel port 131 corresponds to an example of the second physical connection port. The information communication section 132a corresponds to an example of the second communication section in the basic embodiment described above. The connection verification section 132b corresponds to an example of the connected connection port verification section. The combination of the setting storage section 133 and the setting control section 134 is an example of the logical connection port storage section as well as an example of the correspondence registered section. The VT/VI information 133b corresponds to an example of the logical connection port information. The zoning setting information 133c corresponds to an example of the "logical correspondence". The LAN terminal 135 corresponds to an example of the second information output port, as well as an example of the second information output port in the first application.

Figure 8:
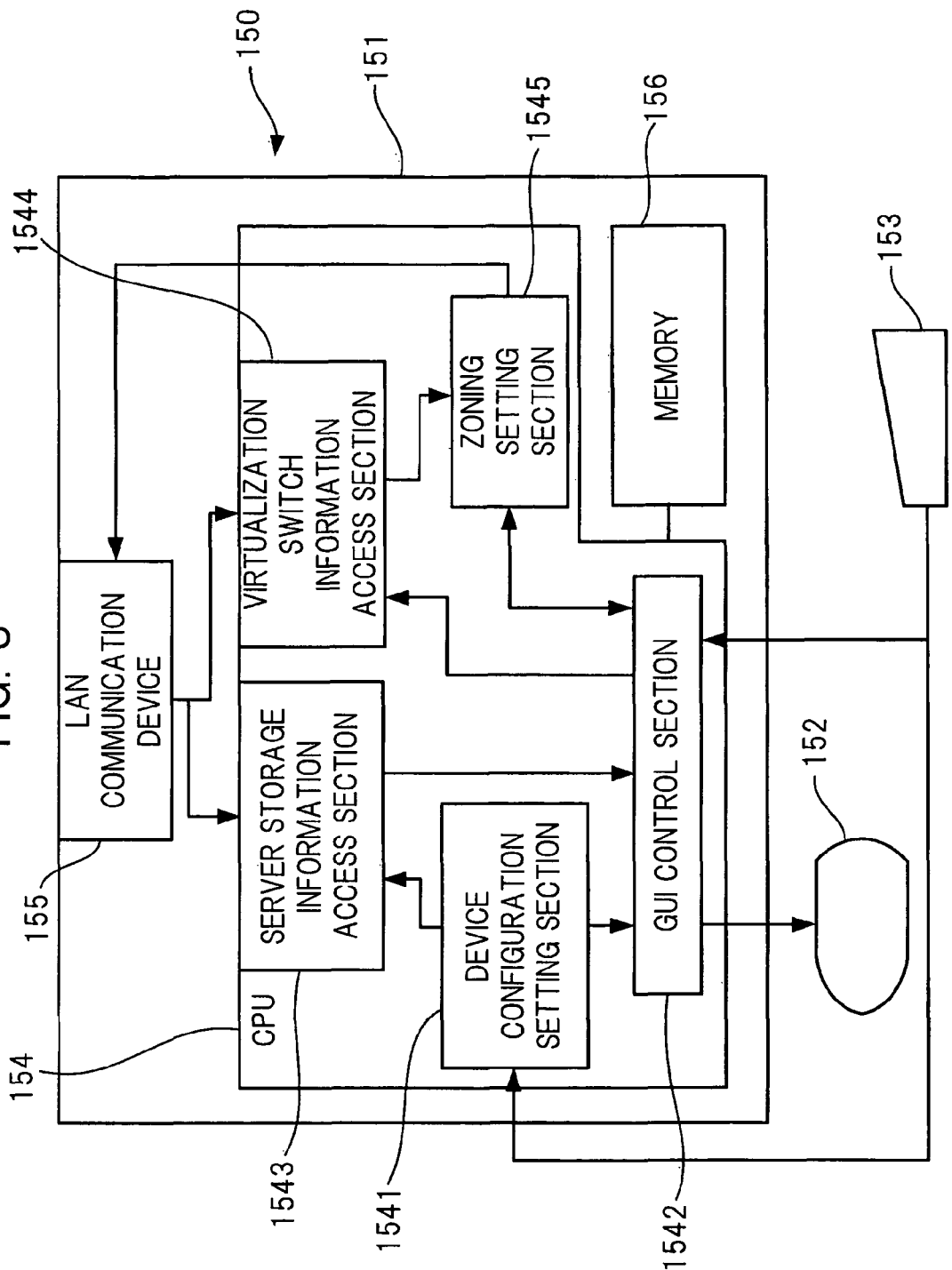
FIG. 8 is a diagram illustrating an internal configuration of an operation management client.

FIG. 8 is a diagram illustrating an internal configuration of an operation management client.

As described above, as the hardware of the operation management client 150, a personal computer is used in the present embodiment. The operation management client 150 includes, as hardware elements, a main body 151 in which a CPU 154, a LAN communication device 155 and a memory 156 are incorporated, a display 152 and an input device 153 such as a keyboard and a mouse. The LAN communication device 155 is connected to the LAN 140 when a LAN cable connection is established. The memory 156 stores process variables used by the CPU 154 for information processing.

The CPU 154 serves as a device configuration setting section 1541 and a graphical user interface (GUI) control section 1542. In addition, the CPU 154 also serves as a server storage information access section 1543, a virtualization switch information access section 1544 and a zoning setting section 1545.

Note that, for hardware and software of the operation management client 150, various elements required for the management of the storage area network 100 are provided in addition to the elements illustrated in FIG. 8. However, in FIG. 8, elements are illustrated by focusing, among the various functions that the operation management client 150 has, on functions as a connection setting apparatus for setting a connection path between devices in the storage area network 100.

Each device including the business server 110, the storage device 120 and the virtualization switch 130 provided on the storage area network 100 is registered with the device configuration setting section 1541 by the input device 153. More specifically, an IP address for accessing each device via the LAN 140 is associated with the type of each device and registered. A combination between the registered IP address and the type of each device is stored in the memory 156 by the device configuration setting section 1541. After that, in the operation management client 150, each device is specified by the IP address.

The GUI control section 1542 controls the display 152 and the input device 153 to build a GUI for a user to set a connection path between devices in the storage area network 100. The operation of the GUI control section 1542 will be described later in detail with reference to a flowchart.

The server storage information access section 1543 acquires WWPNs outputted from the LAN terminals 116 and 127 of the business server 110 and the storage device 120 through the LAN communication device 155 and the LAN 140. More specifically, the server storage information access section 1543 accesses through the LAN 140 an access destination specified by WWPNs outputted from the LAN terminals 116 and 127 and collected in the operation management server 160. In this access, the server storage information access section 1543 specifies a device with the IP address described above and acquires the WWPN collected by the operation management server 160 from the specified device. The acquired WWPN is associated with the IP address of the specified device and stored in the memory 156. After that, in the operation management client 150, the host bus adapter 111 and the channel adapter 121 of each device are specified by the WWPN.

The virtualization switch information access section 1544 acquires various types of information output from the LAN terminal 135 of the virtualization switch 130 through the LAN communication device 155 and the LAN 140. More specifically, the virtualization switch information access section 1544 accesses through the LAN 140 the information output from the LAN terminal 135 and collected in the operation management server 160. In this access, the virtualization switch information access section 1544 specifies the virtualization switch 130 with the IP address described above and acquires the information collected by the operation management server 160 from the specified virtualization switch 130. The acquired information is associated with the IP address of the specified virtualization switch 130 and stored in the memory 156.

The zoning setting section 1545 registers the zoning setting information 133c with the setting storage section 133 of the virtualization switch 130 through the LAN communication device 155 and the LAN 140. More specifically, the zoning setting section 1545 gives an instruction of setting and registration to the operation management server 160, so that various types of commands to register the zoning setting information 133c are outputted from the operation management server 160 outputs to the virtualization switch 130.

The display 152 corresponds to an example of the display screen. The device configuration setting section 1541 corresponds to an example of the device registered section. The GUI control section 1542 corresponds to an example serving as the connection port display section, the device display section and the selection section. The server storage information access section 1543 corresponds to an example of the physical connection port information acquiring section. The virtualization switch information access section 1544 corresponds to an example of the logical connection port information acquiring section, and corresponds to an example serving as the connected information acquiring section and the connection verification section in the first application. The zoning setting section 1545 corresponds to an example of the correspondence registering section.

Here, the software elements illustrated in FIG. 8 included in the CPU 154 are built by incorporating a zoning setting program into the computer, which is the hardware of the operation management client 150 and executing it.

Figure 9:
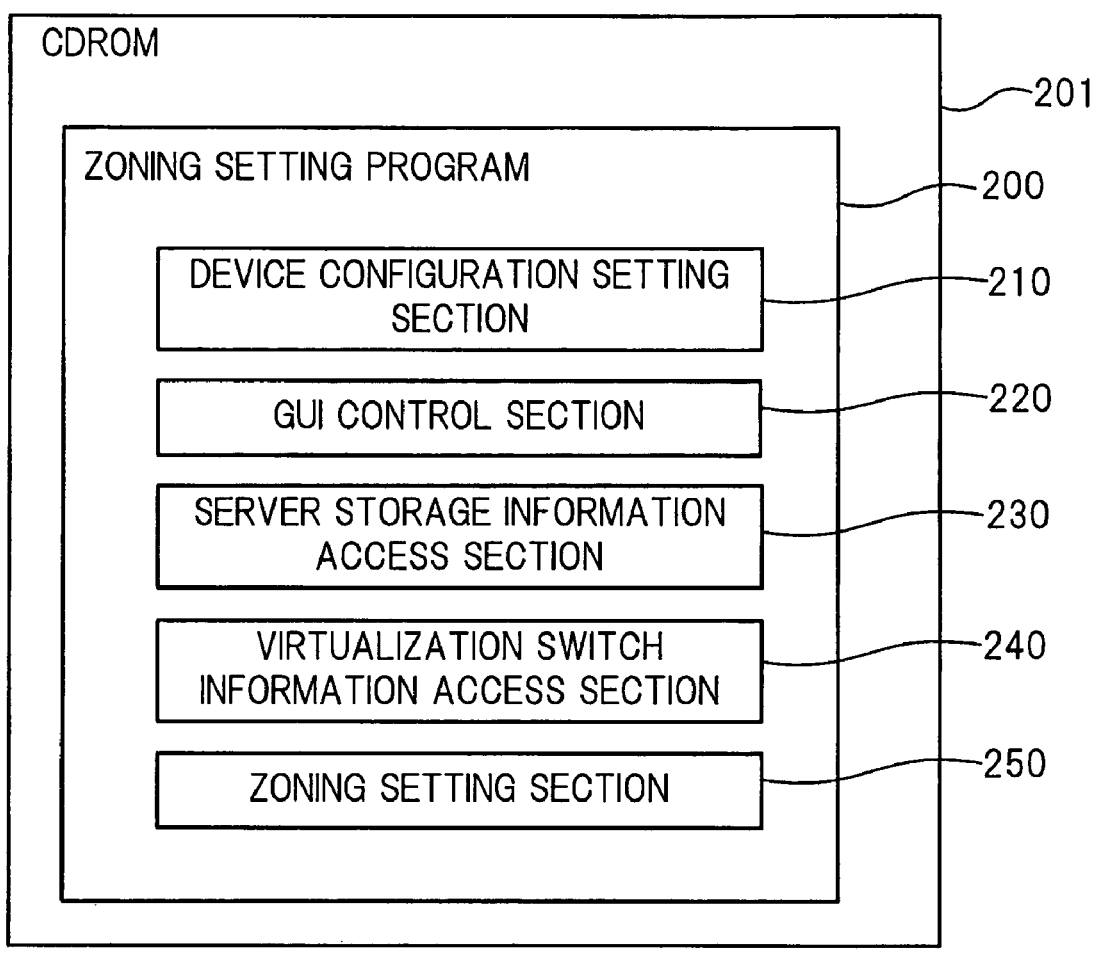
FIG. 9 is a diagram illustrating a zoning setting program.

FIG. 9 is a diagram illustrating a zoning setting program.

A zoning setting program 200 illustrated in FIG. 9 corresponds to a second embodiment of the connection setting program.

The zoning setting program 200 is stored in a CD ROM 201. When the CD ROM 201 storing the zoning setting program 200 is loaded into a computer, the zoning setting program 200 is read by the computer. Then, the read zoning setting program 200 is incorporated into the computer. The zoning setting program 200 incorporated in this manner is executed on the computer, thereby each software element provided on the CPU 154 illustrated in FIG. 8 is built.

In addition to a CD-type medium typified by a CD ROM, a storage medium storing the embodiment of the connection setting program may be a DVD or a flexible disk (FD). Further, such a storage medium may be a magnetic disk housed in a hard disk device or a solid-state memory element typified by a USB memory. Moreover, as an embodiment of a connection setting program, the connection setting program may be supplied from another device connected to the computer to the computer through a telecommunication network.

Incidentally, the zoning setting program 200 includes a device configuration setting section 210, a GUI control section 220, a server storage information access section 230, a virtualization switch information access section 240 and a zoning setting section 250. The device configuration setting section 210 of the zoning setting program 200 illustrated in FIG. 9 builds the device configuration setting section 1541 of the operation management client 150 illustrated in FIG. 8. In addition, the GUI control section 220 and the server storage information access section 230 of the zoning setting program 200 build the GUI control section 1542 and the server storage information access section 1543 of the operation management client 150, respectively. Then, the virtualization switch information access section 240 of the zoning setting program 200 builds the virtualization switch information access section 1544 of the operation management client 150. Further, the zoning setting section 250 of the zoning setting program 200 builds the zoning setting section 1545 of the operation management client 150.

Centering on the operations of the software elements built by such a zoning setting program 200, the operations of the operation management client 150 illustrated in FIG. 8 will be described below with reference to a flowchart. In the description of the following flowchart, elements illustrated in FIGS. 3 to 8 may be cited without specifying the figure number.

Figure 10:
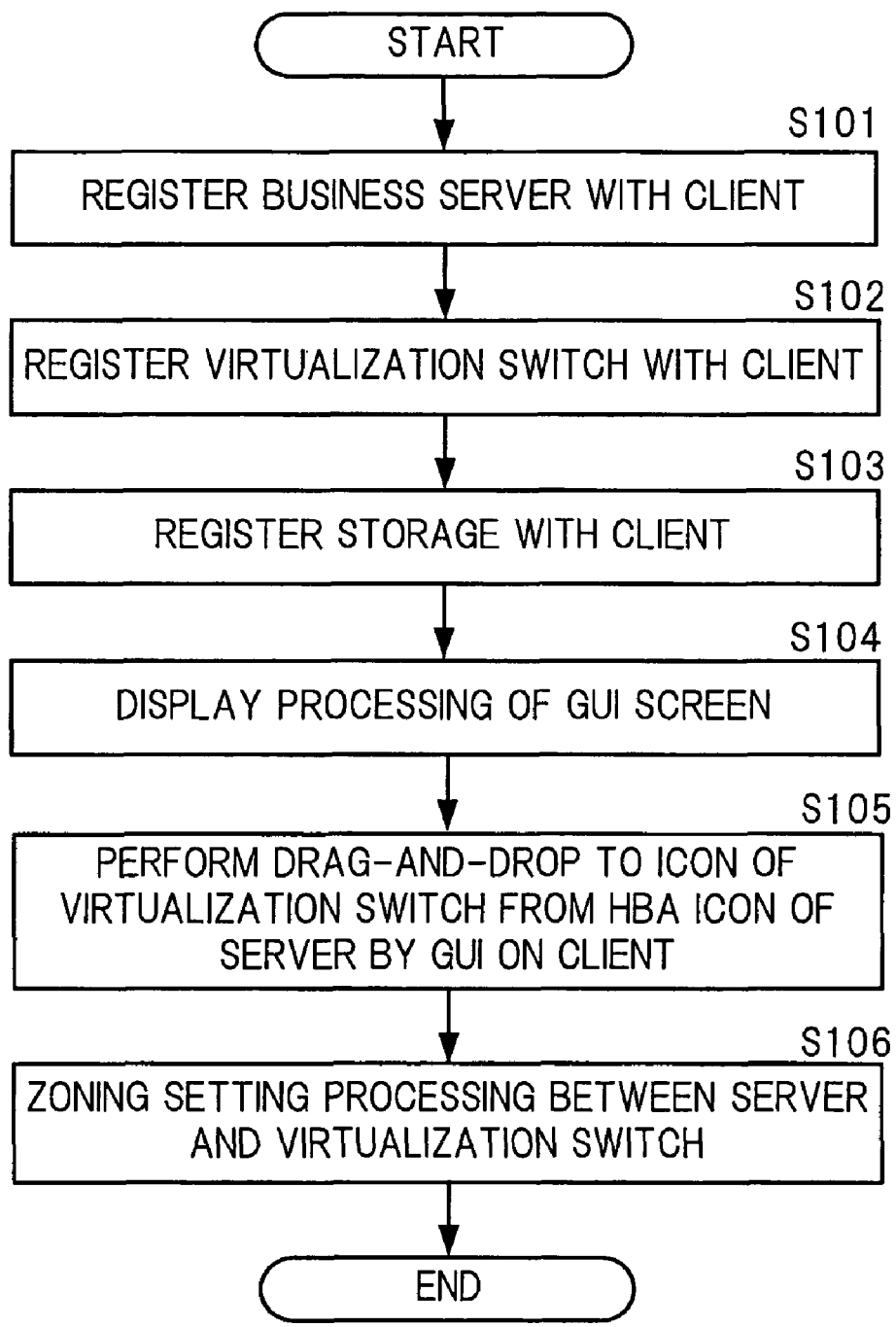
FIG. 10 is a flowchart illustrating a main operation of an operation management client.

FIG. 10 is a flowchart illustrating a main operation of the operation management client. However, the flowchart in FIG. 10 is a flowchart focusing on a user procedure of operating the operation management client 150. In addition, here, the description of the operations will focus, among the devices that the storage area network 100 has, on the connection setting between the business server 110 and the virtualization switch 130.

The user first operates the input device 153 of the operation management client 150 to register the business server 110 with the device configuration setting section 1541 (step S101). As described above, in this registration, information including that the IP address of the business server 110 to be registered is combined with the device type "business server" is input into the device configuration setting section 1541. Next, the user operates the input device 153 of the operation management client 150 to register the virtualization switch 130 with the device configuration setting section 1541 (step S102). Also, in this registration of the virtualization switch 130, information including that the IP address of the virtualization switch 130 to be registered is combined with the device type "virtualization switch" is input into the device configuration setting section 1541. The user further operates the input device 153 of the operation management client 150 to register the storage device 120 with the device configuration setting section 1541 (step S103). Also, in the registration of the storage device 120, the information including that the IP address of the storage device 120 to be registered is combined with the device type "storage device" is input into the device configuration setting section 1541. In this manner, the device configuration setting section 1541 into which the combination information of the IP addresses and the device types is input in steps S101 to S103 stores the combination information into the memory 156. In the registration of these devices, a registration screen for registering devices is displayed on the display 152 of the operation management client 150. Then, the user operates the input device 153 to input information to the registration screen. Since the order of steps S101 to S103 is determined by an order in which the user performs the operation, it does not need to be the order illustrated in FIG. 10. When the registration of the devices in steps S101 to S103 is completed, the user clicks a finish button provided on the registration screen. Then, the operation management client 150 performs display processing that displays the GUI screen for connection setting on the display 152 (step S104).

Figure 11:
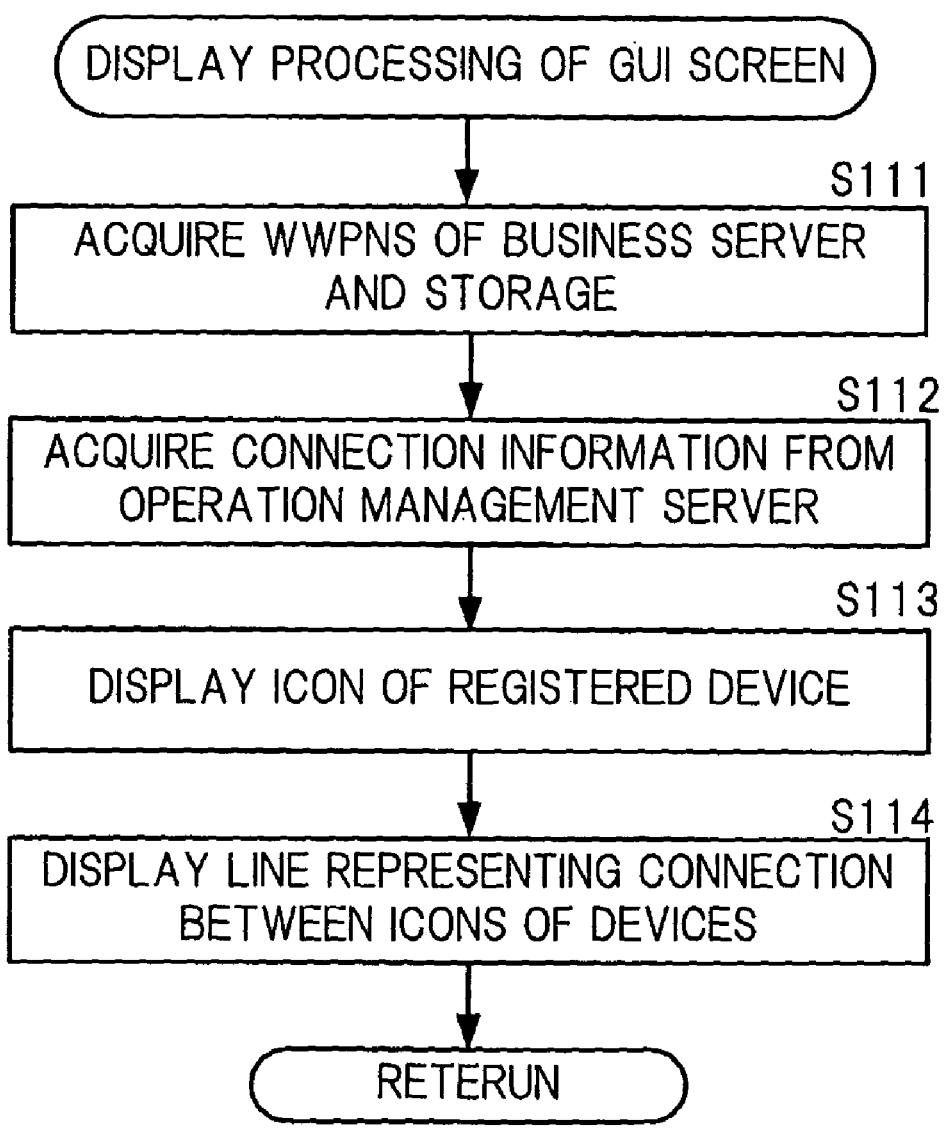
FIG. 11 is a flowchart illustrating the display processing of a GUI screen.

FIG. 11 is a flowchart illustrating display processing of a GUI screen.

When the display processing is started, the server storage information access section 1543 of the operation management client 150 first acquires the WWPNs of the registered business server and storage device from the operation management server 160 (step S111). The server storage information access section 1543 associates the acquired WWPNs with the combination information and stores them into the memory 156. Next, the virtualization switch information access section 1544 acquires the connection information of the registered business server, storage device and virtualization switch from the operation management server 160 (step S112). Then, the virtualization switch information access section 1544 stores the connection information into the memory 156.

When the information is acquired from the operation management server 160 in this manner, the GUI control section 1542 displays on the display 152 an icon of each of the registered business server, storage device and virtualization switch (step S113). More specifically, the GUI control section 1542 verifies the type of each device with the combination information stored in the memory 156. Then, an icon prepared for each device type is assigned to each device, and the assigned icon is displayed on the display 152.

Subsequently, the GUI control section 1542 displays a line between the icons displayed in this manner, the line representing the connection relation represented by the connection information acquired in step S112 (step S114).

Figure 12:
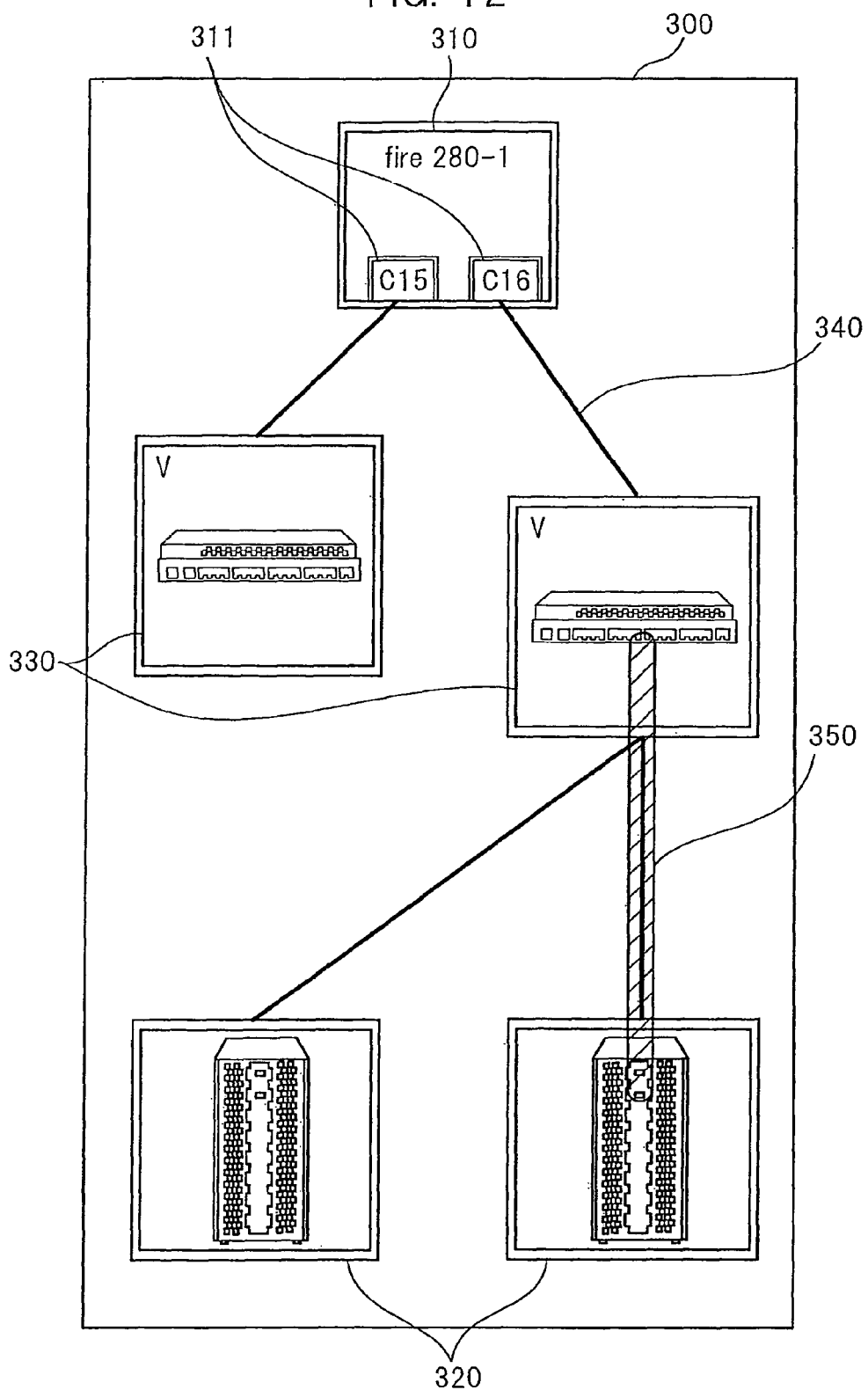
FIG. 12 is a diagram illustrating a GUI screen for connection setting.

FIG. 12 is a diagram illustrating a GUI screen for connection setting.

On a GUI screen 300 illustrated in FIG. 12, a business server icon 310 representing the business server, a storage device icon 320 representing the storage device, and a virtualization switch icon 330 representing the virtualization switch are displayed. In addition, an HBA icon 311 representing a host bus adapter that the business server has is also displayed on the business server icon 310. The HBA icon 311 is displayed when the business server icon 310 is double clicked, which is not illustrated in the flowchart. Moreover, the HBA icon 311 is displayed by the GUI control section 1542 regarding each host bus adapter specified by the WWPN acquired in step S111 of FIG. 11. When the storage device icon 320 is double clicked, a CA icon is also displayed representing a channel adapter that the storage device has, which is not illustrated.

On the GUI screen 300 illustrated in this figure, a solid line 340 representing a physical connection and a wide line 350 representing a logical connection are also displayed between icons.

The solid line 340 among these lines 340 and 350 is displayed based on the physical connection information 133a stored in the setting storage section 133 of the virtualization switch 130. The wide line 350 is displayed based on the zoning setting information 133c stored in the setting storage section 133 of the virtualization switch 130.

The physical connection information 133a and the zoning setting information 133c used for the display of these lines 340 and 350 are acquired from the operation management server 160 from the setting storage section 133 of the virtualization switch 130 when periodically accessed by the operation management server 160. These pieces of information are subsequently acquired by the virtualization switch information access section 1544 in step S112 of FIG. 11. However, since the lines displayed on the GUI screen 300 in this manner are displayed based on the information acquired when the GUI screen 300 is displayed for the first time, a change in the information after the GUI screen 300 is displayed is not reflected. Therefore, regarding the connection condition, most recent information is acquired later.

The virtualization switch icon 330 corresponds to an example of the device mark. The HBA icon 311 and the CA icon correspond to an example of the physical connection port mark.

When the user performs connection setting between the business server and the virtualization switch, the user performs drag-and-drop from the HBA icon 311 to the virtualization switch icon 330 on the GUI screen 300 as illustrated in FIG. 12 (step S105 of FIG. 10). The GUI control section 1542 of the operation management client 150 detects the drag-and-drop operation to recognize the host bus adapter and the virtualization switch, which are selected as connection targets. Then, the GUI control section 1542 conveys to the virtualization switch information access section 1544 and the zoning setting section 1545, the selection information representing the recognized host bus adapter and virtualization switch. Subsequently, in the operation management client 150, the zoning setting processing between the server and the virtualization switch is performed (step S106 of FIG. 10).

Figure 13:
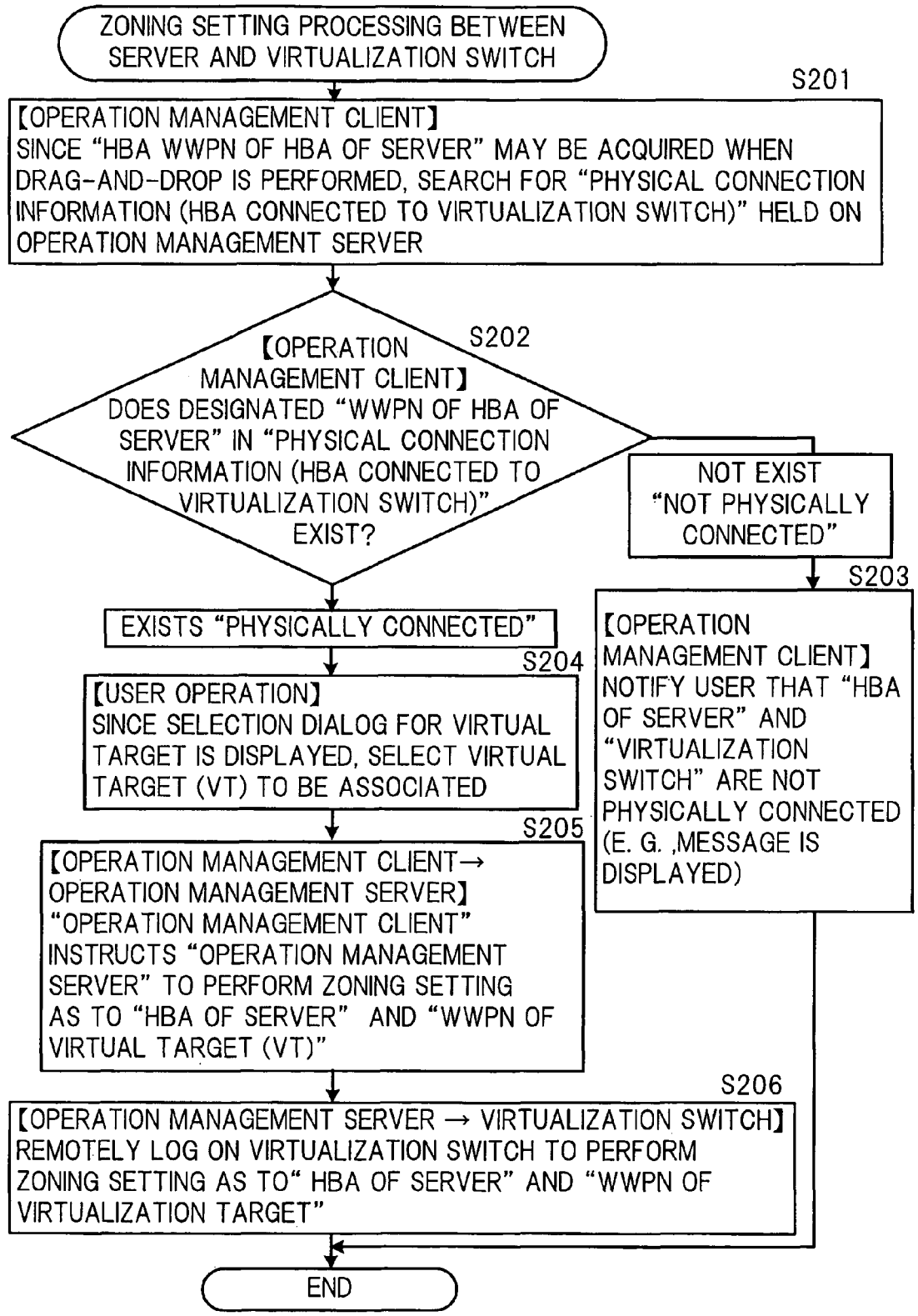
FIG. 13 is a flowchart illustrating zoning setting processing between a server and a virtualization switch.

FIG. 13 is a flowchart illustrating zoning setting processing between a server and a virtualization switch.

In the processing illustrated in FIG. 13, first, in step S201, the virtualization switch information access section 1544 of the operation management client 150 acquires physical connection information. By the virtualization switch information access section 1544 accessing the operation management server 160 in regard to the virtualization switch represented by the selection information conveyed by the GUI control section 1542, the physical connection information is acquired.

Here, the details of the physical connection information stored in the operation management server 160 will be described.

Figure 14:
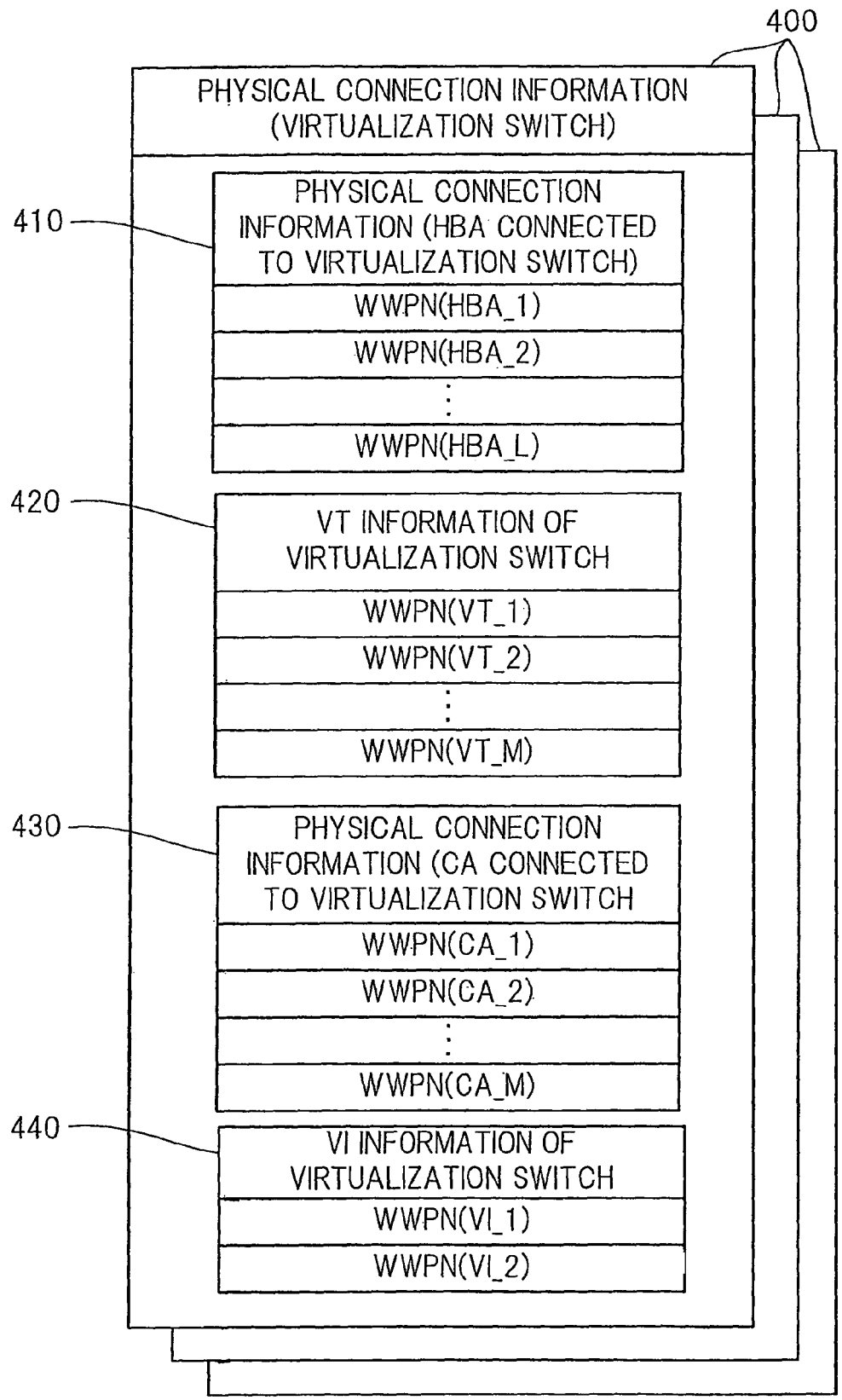
FIG. 14 is a diagram illustrating physical connection information stored in an operation management server.

FIG. 14 is a diagram illustrating physical connection information stored in the operation management server.

Physical connection information 400 collected from the setting storage section 133 of each virtualization switch 130 connected by the LAN 140 is grouped for each virtualization switch and stored in the operation management server 160. The physical connection information 400 includes HBA physical connection information 410, VT information 420, CA physical connection information 430 and VI information 440.

The HBA physical connection information 410 and the CA physical connection information 430 correspond to the physical connection information 133a stored in the setting storage section 133 of the virtualization switch 130.

More specifically, the WWPN of each host bus adapter 111 at a physical connection destination verified by the connection verification section 132b of the virtualization switch 130 is listed in the HBA physical connection information 410. Similarly, the WWPN of the channel adapter 121 at a physical connection destination verified by the connection verification section 132b of the virtualization switch 130 is listed in the CA physical connection information 430.

The VT information 420 and the VI information 440 correspond to the VT/VI information 133b stored in the setting storage section 133 of the virtualization switch 130. In the VT information 420, WWPNs are listed, which represent logical connection ports, which are to be logical connection parties of the host bus adapter 111. Although the fibre channel 170 connected to the host bus adapter 111 is physically connected to the channel port 131 of the virtualization switch 130, no WWPN is given to the channel port 131. Regardless of which channel port 131 the fibre channel 170 is physically connected to, the virtualization switch 130 may switch the WWPN of the connection destination by the information communication section 132a of the communication section 132. As the connection party of the host bus adapter 111, switching is possible to one that is selected from among the WWPNs set as the VT information 420 beforehand by the user. On the other hand, in the VI information 440, WWPNs are listed, which represent logical connection ports, which are to be logical connection parties of the channel adapter 121. The WWPNs listed in the VI information 440 have already been registered at the time of shipment of the virtualization switch 130, and modification and addition by the user are not possible. All the WWPNs listed in the VI information 440 (two in FIG. 14) are connection parties of the channel adapter 121.

When the physical connection information 400 is acquired by the virtualization switch information access section 1544 in step S201 of FIG. 13, the virtualization switch information access section 1544 stores the physical connection information 400 in the memory 156. Then, in step S201, the virtualization switch information access section 1544 further searches for a WWPN in the WWPNs listed in the HBA physical connection information 410 contained in the physical connection information 400. The WWPN searched in this search is the WWPN of the host bus adapter represented by the selection information conveyed from the GUI control section 1542.

Next, in step S202, the virtualization switch information access section 1544 determines whether or not the WWPN of the host bus adapter exists in the HBA physical connection information 410. If it is determined that no WWPN of the host bus adapter exists, this means that the host bus adapter and the virtualization switch selected by the user on the GUI as the connection targets are not physically connected. Therefore, the operation management client 150 notifies the user that the selected host bus adapter and virtualization switch are not physically connected (step S203). This notification is performed by displaying a message on the display 152, for example.

On the other hand, in step S202, if it is determined that the WWPN of the selected host bus adapter exists in the HBA physical connection information 410, this means that the host bus adapter and virtualization switch selected by the user as connection targets are physically connected.

In this case, in step S204, a selection dialog allowing the user to select one WWPN from among the WWPNs listed in the VT information 420 of the physical connection information 400 is displayed on the display 152 by the zoning setting section 1545. The user operates the selection dialog through the input device 153 to select the WWPN. The selected WWPN represents the WWPN of the virtual target as the target of the connection.

In this manner, the WWPN of the host bus adapter selected in the GUI and the WWPN of the virtual target selected in step S204 are to be mutual connection targets.

When the combination of the WWPNs, which are to be mutual connection targets, is determined in this manner, the zoning setting section 1545 instructs the operation management server 160 to perform zoning setting with this combination (step S205). Then, in step S206, the operation management server 160 inputs a command into the virtualization switch 130 via the LAN 140. As a result, the zoning setting information 133c corresponding to the combination is stored in the setting storage section 133 of the virtualization switch 130. More specifically, the operation management server 160 first logs on the virtualization switch 130 via the LAN 140. Next, the operation management server 160 issues a zonecreate command to create a zone having the WWPN of the host bus adapter in the combination. Then, the operation management server 160 issues a zoneadd command to add the WWPN of the virtual target in the combination to the zone. Finally, the operation management server 160 issues a cfgadd command to store the zoning setting information 133c representing the zone into the setting storage section 133 of the virtualization switch 130.

By the operation in the operation management client 150 and the like as described above, a logical connection between the host bus adapter 111 of the business server 110 and the virtual target of the virtualization switch 130 is set.

In setting the connection, except for examining the IP address of the device to which the user desires to connect among the devices that the storage area network 100 includes, it is unnecessary that the user examines the information in particular, and so connection setting is performed effectively. In addition, the connection between desired devices are reliably set by the user operation on the GUI.

In addition, according to the present embodiment, since a physical connection is verified before a logical connection is set, a logical connection is reliably achieved.

Although the operations have been described focusing on the connection setting between the business server 110 and the virtualization switch 130 among devices that the storage area network 100 has, the operation will be described focusing on the connection setting between the virtualization switch 130 and the storage device 120 below.

Figure 15:
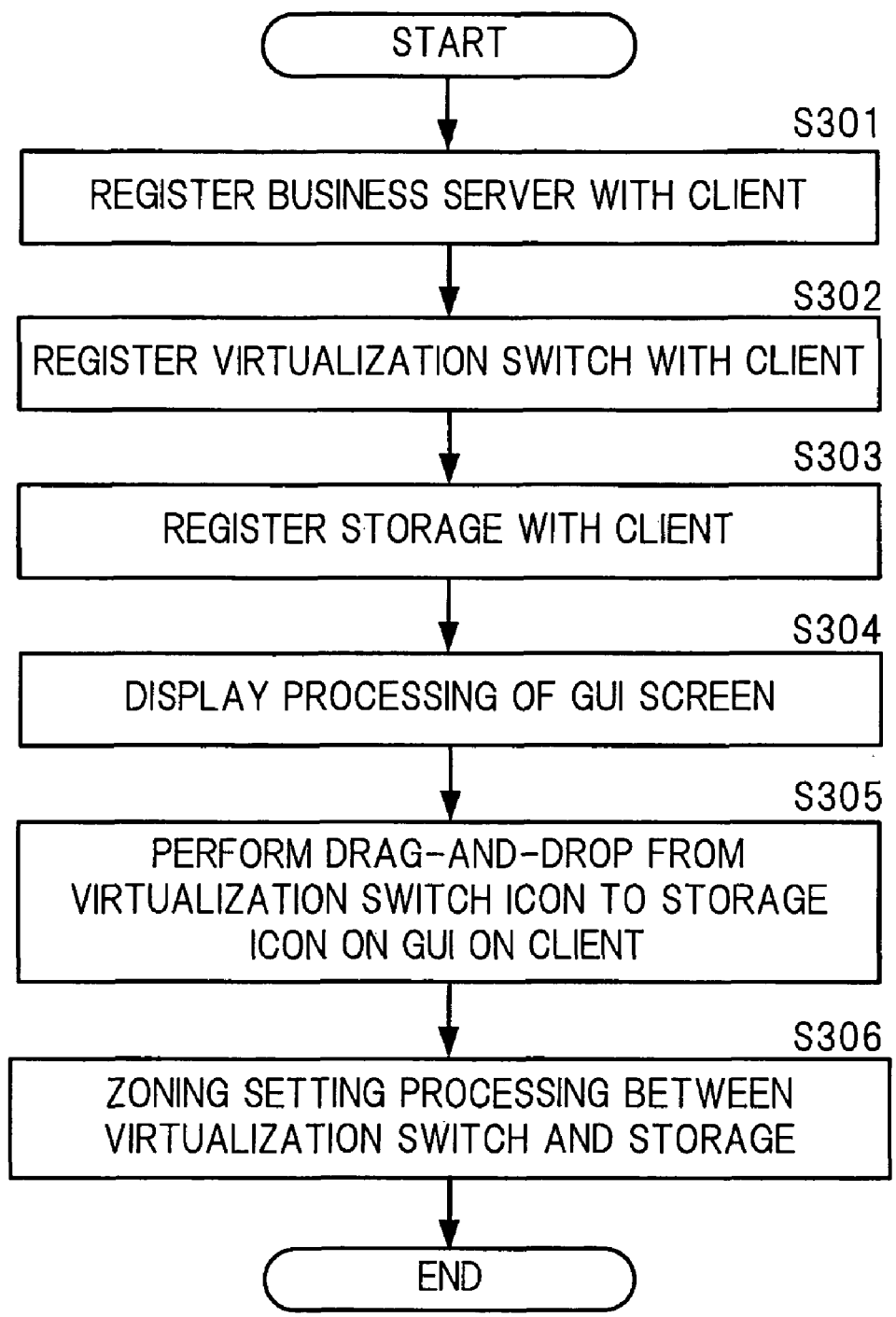
FIG. 15 is a flowchart illustrating a main operation of the operation management client, focusing on connection setting between a virtualization switch and a storage device.

FIG. 15 is a flowchart illustrating the main operation of the operation management client, focusing on the connection setting between a virtualization switch and a storage device.

Although six steps S301 to S306 are illustrated in FIG. 15, among these steps, since the operations are the same as in steps S101 to S104 illustrated in FIG. 10 for the first four steps S301 to S304, redundant descriptions will be omitted.

When performing connection setting between a virtual switch and a storage device, the user performs drag-and-drop from the virtualization switch icon 330 to the CA icon (not illustrated) of the storage on the GUI screen 300 as illustrated in FIG. 12 (step S305). The GUI control section 1542 of the operation management client 150 detects the drag-and-drop operation to recognize the channel adapter and the virtualization switch, which are selected as connection targets. Then, the GUI control section 1542 conveys to the virtualization switch information access section 1544 and the zoning setting section 1545, the selection information representing the recognized channel adapter and virtualization switch. Subsequently, the operation management client 150 performs zoning setting processing between the virtualization switch and the storage device (step S306).

FIG. 16 is a flowchart illustrating zoning setting processing between a visualization switch and a storage device.

In the processing illustrated in FIG. 16, first, in step S401, the virtualization switch information access section 1544 of the operation management client 150 acquires the physical connection information. By the virtualization switch information access section 1544 accessing the operation management server 160 in regard to the virtualization switch represented by the selection information conveyed from the GUI control section 1542, the physical connection information is acquired.

The acquired physical connection information 400 is then stored in the memory 156 by the virtualization switch information access section 1544. In step S401, the virtualization switch information access section 1544 further searches for a WWPN in the WWPNs listed in the CA physical connection information 430 contained in the physical connection information 400. The WWPN searched in this search is the WWPN of the channel adapter represented by the selection information conveyed from the GUI control section 1542.

As a result of the search, if no WWPN of the channel adapter exists, this means that the channel adapter and virtualization switch selected by the user on the GUI as the connection targets are not physically connected. Therefore, the operation management client 150 notifies the user that the selected channel adapter and virtualization switch are not physically connected (step S402). This notification is performed by displaying a message on the display 152, for example.

On the other hand, as a result of the search in S401, if the WWPN of the selected channel adapter exists in the CA physical connection information 430, this means that the channel adapter and virtualization switch selected by the user as connection targets are physically connected. Then, in the case of the zoning setting between the virtualization switch and the storage device, the physical connection is verified so that the combination of the WWPNs to be mutual connection targets is automatically determined. In other words, each WWPN listed in the VI information 440 of the physical connection information 400 and the WWPN of the channel adapter selected by the user as a connection target are to be mutual connection targets.

If the WWPN of the selected channel adapter exists in the CA physical connection information 430, the zoning setting section 1545 instructs the operation management server 160 to perform zoning setting with this combination (step S403). The operation management server 160 inputs a command to the virtualization switch 130 via the LAN 140 to store in the setting storage section 133 zoning setting information 133c corresponding to the combination (step S404). More specifically, the operation management server 160 first logs on the virtualization switch 130 via the LAN 140. Next, the operation management server 160 uses a zonecreate command to create a zone having each WWPN of each virtual initiator in the combination. Then, the operation management server 160 uses a zoneadd command to add the WWPN of the channel adapter in the combination to the zone. Finally, the operation management server 160 uses a cfgadd command to store the zoning setting information 133c representing the zone into the setting storage section 133 of the virtualization switch 130.

Next, the operation management server 160 that stores the zoning setting information 133c into the setting storage section 133 in this manner logs on the storage device 120 that has a channel adapter specified by the WWPN in the combination of connection targets via the LAN 140. Then, the operation management server 160 instructs the setting control section 126 of the storage device 120 to perform zoning setting corresponding to the combination (step S405). The setting control section 126 which receives such an instruction verifies the zone setting information 125b to recognize the zone 120a to which the WWPN of the channel adapter 121 contained in the combination belongs. Then, the setting control section 126 adds and sets each WWPN of each virtual initiator in the combination to the zone setting information 125b as the WWPN of the connection party that may access the zone 120a (step S406).

By the operation in the operation management client 150 and the like as described above, a connection between the virtual initiator of the virtualization switch 130 and the channel adapter 121 of the storage device 120 is set. In setting the connection, except for examining the IP address of the device to which the user desires to connect among the devices that the storage area network 100 has, it is unnecessary that the user examines the information in particular, and so connection setting is performed effectively. In addition, the connection between desired devices are reliably set by the user operation on the GUI.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information communication system comprising:
  a first information communication device that includes:
    a first physical connection port to which a communication line is physically connected;
    a first communication section that performs information communication through the first physical connection port; and
    a first information output port that outputs physical connection port information which specifies the first physical connection port;
  a second information communication device that includes:
    a second physical connection port to which a communication line of information communication is physically connected;
    a logical connection port storage section that stores logical connection port information which specifies a logical connection port to be a logical connection destination for the first physical connection port;
    a correspondence registered section in which a logical correspondence between the logical connection port specified by the logical connection port information and the first physical connection port is registered;
    a second communication section that performs communication through the second physical connection port to the first physical connection port for which the logical correspondence with the logical connection port specified by the logical connection port information is registered in the correspondence registered section; and
    a second information output port that outputs the logical connection port information stored in the logical connection port storage section; and
  a connection setting apparatus that includes:
    a device registered section in which first device information that specifies the first information communication device and second device information that specifies the second information communication device are registered;
    a physical connection port information acquiring section that acquires the physical connection port information from the first information output port of the first information communication device specified by the first device information registered in the device registered section;
    a logical connection port information acquiring section that acquires the logical connection port information from the second information output port of the second information communication device specified by the second device information registered in the device registered section;
    a connection port display section that displays on a display screen a physical connection port mark which represents the first physical connection port specified by the physical connection port information;
    a device display section that displays on the display screen a device mark which represents the second information communication device specified by the second device information registered in the device registered section;
    a selection section that selects the first physical connection port and the second information communication device, which are to be communication parties with each other in information communication, by a selection operation to the physical connection port mark and the device mark displayed on the display screen; and
    a correspondence registering section that registers the logical correspondence between the logical connection port specified by the logical connection port information acquired by the logical connection port information acquiring section and the first physical connection port selected by the selection section, in the correspondence registered section of the second information communication device selected by the selection section.

2. The information communication system according to claim 1, wherein the second information communication device includes a connected connection port verification section that acquires physical connection port information which specifies, through a communication line physically connected to the second physical connection port, a first physical connection port to which the communication line is connected, the second information output port of the second information communication device also outputs the physical connection port information acquired by the connected connection port verification section, the connection setting apparatus includes:

a connected information acquiring section that acquires the physical connection port information acquired by the connected connection port verification section of the second information communication device from a second information output port of the second information communication device selected by the selection section; and a connection verification section that verifies whether or not the physical connection port information which specifies the first physical connection port selected by the selection section is contained in the physical connection port information acquired by the connected information acquiring section, and the correspondence registering section of the connection setting apparatus registers the logical correspondence when a fact that physical connection port information which specifies a first physical connection port selected by the selection section is contained in physical connection port information acquired by the connected information acquiring section is verified in the connection verification section.

3. The information communication system according to claim 1, wherein the information communication system includes as the first information communication device two or more types of devices that perform information intercommunication through the second information communication device, and the second information communication device builds a logical communication path in information intercommunication among the two or more types of devices.

4. The information communication system according to claim 2, wherein the information communication system includes as the first information communication device two or more types of devices that perform information intercommunication through the second information communication device, and the second information communication device builds a logical communication path in information intercommunication among the two or more types of devices.

5. A connection setting apparatus comprising:

a device registered section in which are registered first device information that specifies a first information communication device including a first physical connection port to which a communication line is physically connected, a first communication section that performs information communication through the first physical connection port, and a first information output port that outputs physical connection port information which specifies the first physical connection port, and second device information that specifies a second information communication device including a second physical connection port to which a communication line is physically connected, a logical connection port storage section that stores logical connection port information which specifies a logical connection port to be a logical connection destination for the first physical connection port, a correspondence registered section in which a logical correspondence between the logical connection port specified by the logical connection port information and the first physical connection port, a second communication section that performs information communication through the second physical connection port to the first physical connection port for which the logical correspondence with the logical connection port specified by the logical connection port information is registered with the correspondence registered section, and a second information output port that outputs the logical connection port information stored in the logical connection port storage section;

a physical connection port information acquiring section that acquires the physical connection port information from the first information output port of the first information communication device specified by the first device information registered in the device registered section;

a logical connection port information acquiring section that acquires the logical connection port information from the second information output port of a second information communication device specified by the second device information registered in the device registered section;

a connection port display section that displays on a display screen the physical connection port mark which represents a first physical connection port specified by the physical connection port information acquired by the physical connection port information acquiring section;

a device display section that displays on the display screen a device mark, which represents the second information communication device specified by the second device information registered in the device registered section;

a selection section that selects the first physical connection port and the second information communication device, which are to be communication parties with each other in information communication, by a selection operation to the physical connection port mark and the device mark which are displayed on the display screen; and a correspondence registering section that registers the logical correspondence between a logical connection port specified by the logical connection port information acquired by the logical connection port information acquiring section and the first physical connection port selected by the selection section in the correspondence registered section of the second information communication device selected by the selection section.

6. A non-transitory computer-readable storage medium storing a connection setting program that is incorporated in a computer to build in the computer:

a device registered section in which are registered first device information that specifies a first information communication device including a first physical connection port to which a communication line is physically connected, a first communication section that performs information communication through the first physical connection port, and a first information output port that outputs physical connection port information which specifies the first physical connection port, and second device information that specifies a second information communication device including a second physical connection port to which a communication line is physically connected, a logical connection port storage section that stores logical connection port information which specifies a logical connection port to be a logical connection destination for the first physical connection port, a correspondence registered section in which a logical correspondence between the logical connection port specified by the logical connection port information and the first physical connection port, a second communication section that performs information communication through the second physical connection port to the first physical connection port for which the logical correspondence with the logical connection port specified by the logical connection port information is registered with the correspondence registered section, and a second information output port that outputs the logical connection port information stored in the logical connection port storage section;

a physical connection port information acquiring section that acquires the physical connection port information from the first information output port of the first information communication device specified by the first device information registered in the device registered section;

a logical connection port information acquiring section that acquires the logical connection port information from the second information output port of a second information communication device specified by the second device information registered in the device registered section;

a connection port display section that displays on a display screen the physical connection port mark which represents a first physical connection port specified by the physical connection port information acquired by the physical connection port information acquiring section;

a device display section that displays on the display screen a device mark, which represents the second information communication device specified by the second device information registered in the device registered section;

a selection section that selects the first physical connection port and the second information communication device, which are to be communication parties with each other in information communication, by a selection operation to the physical connection port mark and the device mark which are displayed on the display screen; and a correspondence registering section that registers the logical correspondence between a logical connection port specified by the logical connection port information acquired by the logical connection port information acquiring section and the first physical connection port selected by the selection section in the correspondence registered section of the second information communication device selected by the selection section.

* * * * *